United States Patent
Zhao et al.

(10) Patent No.: US 12,545,010 B2
(45) Date of Patent: Feb. 10, 2026

(54) DIRECTLY BONDED METAL STRUCTURES HAVING OXIDE LAYERS THEREIN

(71) Applicant: ADEIA SEMICONDUCTOR BONDING TECHNOLOGIES INC., San Jose, CA (US)

(72) Inventors: Oliver Zhao, Sunnyvale, CA (US); Bongsub Lee, Santa Clara, CA (US); Cyprian Emeka Uzoh, San Jose, CA (US)

(73) Assignee: Adeia Semiconductor Bonding Technologies Inc., San Jose, CA (US)

( * ) Notice: Subject to any disclaimer, the term of this patent is extended or adjusted under 35 U.S.C. 154(b) by 319 days.

(21) Appl. No.: 18/148,160

(22) Filed: Dec. 29, 2022

(65) Prior Publication Data

US 2024/0217210 A1 Jul. 4, 2024

(51) Int. Cl.
| | |
|---|---|
| *B32B 15/01* | (2006.01) |
| *B32B 3/26* | (2006.01) |
| *B32B 3/30* | (2006.01) |
| *B32B 15/20* | (2006.01) |

(52) U.S. Cl.
CPC ............ *B32B 15/016* (2013.01); *B32B 3/266* (2013.01); *B32B 3/30* (2013.01); *B32B 15/017* (2013.01); *B32B 15/20* (2013.01); *B32B 2250/02* (2013.01); *B32B 2307/202* (2013.01); (Continued)

(58) Field of Classification Search
None
See application file for complete search history.

(56) References Cited

U.S. PATENT DOCUMENTS

| | | |
|---|---|---|
| 4,939,568 A | 7/1990 | Kato et al. |
| 4,998,665 A | 3/1991 | Hayashi |
| 5,087,585 A | 2/1992 | Hayashi |

(Continued)

FOREIGN PATENT DOCUMENTS

| | | |
|---|---|---|
| CN | 1112286 A | 11/1995 |
| CN | 103531492 A | 1/2014 |

(Continued)

OTHER PUBLICATIONS

Berla et al., "A Model for Power Law Creep Controlled Hillock Growth". Materials Science and Engineering: A. Aug. 15, 2008;488(1-2): 594-600.

(Continued)

*Primary Examiner* — Daniel J. Schleis
(74) *Attorney, Agent, or Firm* — Knobbe, Martens, Olson & Bear, LLP

(57) ABSTRACT

An element, bonded structure that includes the element, and methods forming the same are disclosed. A bonded structure can include a first element having a first nonconductive field region and a first conductive feature, and a second element having a second nonconductive field region and a second conductive feature. The second element is directly hybrid bonded to the first element such that the first and second nonconductive field regions are directly bonded to one another along a bond interface and the first and second conductive features are directly bonded to one another. The first conductive feature can include a perforated oxide layer. 1 at. % to 20 at. % of the first aluminum feature can be aluminum oxide.

18 Claims, 8 Drawing Sheets

(52) U.S. Cl.
CPC ..... *B32B 2307/206* (2013.01); *B32B 2311/22* (2013.01); *B32B 2311/24* (2013.01)

(56) References Cited

U.S. PATENT DOCUMENTS

| | | | |
|---|---|---|---|
| 5,236,118 A | 8/1993 | Bower et al. |
| 5,322,593 A | 6/1994 | Hasegawa et al. |
| 5,413,952 A | 5/1995 | Pages et al. |
| 5,421,953 A | 6/1995 | Nagakubo et al. |
| 5,442,235 A | 8/1995 | Parrillo et al. |
| 5,489,804 A | 2/1996 | Pasch |
| 5,501,003 A | 3/1996 | Bernstein |
| 5,503,704 A | 4/1996 | Bower et al. |
| 5,516,727 A | 5/1996 | Broom |
| 5,610,431 A | 3/1997 | Martin |
| 5,734,199 A | 3/1998 | Kawakita et al. |
| 5,753,536 A | 5/1998 | Sugiyama et al. |
| 5,771,555 A | 6/1998 | Eda et al. |
| 5,821,692 A | 10/1998 | Rogers et al. |
| 5,866,942 A | 2/1999 | Suzuki et al. |
| 5,904,860 A | 5/1999 | Nagakubo et al. |
| 5,985,739 A | 11/1999 | Plettner et al. |
| 5,998,808 A | 12/1999 | Matsushita |
| 6,008,126 A | 12/1999 | Leedy |
| 6,063,968 A | 5/2000 | Hubner et al. |
| 6,071,761 A | 6/2000 | Jacobs |
| 6,080,640 A | 6/2000 | Gardner et al. |
| 6,097,096 A | 8/2000 | Gardner et al. |
| 6,117,784 A | 9/2000 | Uzoh |
| 6,123,825 A | 9/2000 | Uzoh et al. |
| 6,147,000 A | 11/2000 | You et al. |
| 6,232,150 B1 | 5/2001 | Lin et al. |
| 6,258,625 B1 | 7/2001 | Brofman et al. |
| 6,259,160 B1 | 7/2001 | Lopatin et al. |
| 6,265,775 B1 | 7/2001 | Seyyedy |
| 6,297,072 B1 | 10/2001 | Tilmans et al. |
| 6,316,786 B1 | 11/2001 | Mueller et al. |
| 6,333,120 B1 | 12/2001 | DeHaven et al. |
| 6,333,206 B1 | 12/2001 | Ito et al. |
| 6,348,709 B1 | 2/2002 | Graettinger et al. |
| 6,374,770 B1 | 4/2002 | Lee |
| 6,409,904 B1 | 6/2002 | Uzoh et al. |
| 6,423,640 B1 | 7/2002 | Lee et al. |
| 6,433,402 B1 | 8/2002 | Wo et al. |
| 6,465,892 B1 | 10/2002 | Suga |
| 6,528,894 B1 | 3/2003 | Akram et al. |
| 6,552,436 B2 | 4/2003 | Burnette et al. |
| 6,555,917 B1 | 4/2003 | Heo |
| 6,579,744 B1 | 6/2003 | Jiang |
| 6,583,515 B1 | 6/2003 | James et al. |
| 6,589,813 B1 | 7/2003 | Park |
| 6,600,224 B1 | 7/2003 | Farquhar et al. |
| 6,624,003 B1 | 9/2003 | Rice |
| 6,627,814 B1 | 9/2003 | Stark |
| 6,632,377 B1 | 10/2003 | Brusic et al. |
| 6,660,564 B2 | 12/2003 | Brady |
| 6,667,225 B2 | 12/2003 | Hau-Riege et al. |
| 6,828,686 B2 | 12/2004 | Park |
| 6,837,979 B2 | 1/2005 | Uzoh et al. |
| 6,864,585 B2 | 3/2005 | Enquist |
| 6,887,769 B2 | 5/2005 | Kellar et al. |
| 6,902,987 B1 | 6/2005 | Tong et al. |
| 6,908,027 B2 | 6/2005 | Tolchinsky et al. |
| 6,909,194 B2 | 6/2005 | Farnworth et al. |
| 6,962,835 B2 | 11/2005 | Tong et al. |
| 6,974,769 B2 | 12/2005 | Basol et al. |
| 7,045,453 B2 | 5/2006 | Canaperi et al. |
| 7,078,811 B2 | 7/2006 | Suga |
| 7,105,980 B2 | 9/2006 | Abbott et al. |
| 7,109,063 B2 | 9/2006 | Jiang |
| 7,126,212 B2 | 10/2006 | Enquist et al. |
| 7,193,423 B1 | 3/2007 | Dalton et al. |
| 7,238,919 B2 | 7/2007 | Kaneko et al. |
| 7,354,798 B2 | 4/2008 | Pogge et al. |
| 7,485,968 B2 | 2/2009 | Enquist et al. |
| 7,750,488 B2 | 7/2010 | Patti et al. |
| 7,803,693 B2 | 9/2010 | Trezza |
| 7,998,335 B2 | 8/2011 | Feeney et al. |
| 8,039,966 B2 | 10/2011 | Yang et al. |
| 8,101,858 B2 | 1/2012 | Hannour et al. |
| 8,168,532 B2 | 5/2012 | Haneda et al. |
| 8,183,127 B2 | 5/2012 | Patti et al. |
| 8,241,961 B2 | 8/2012 | Kim et al. |
| 8,242,600 B2 | 8/2012 | Yang et al. |
| 8,314,007 B2 | 11/2012 | Vaufredaz |
| 8,349,635 B1 | 1/2013 | Gan et al. |
| 8,377,798 B2 | 2/2013 | Peng et al. |
| 8,435,421 B2 | 5/2013 | Keleher et al. |
| 8,441,131 B2 | 5/2013 | Ryan |
| 8,476,146 B2 | 7/2013 | Chen et al. |
| 8,476,165 B2 | 7/2013 | Trickett et al. |
| 8,482,132 B2 | 7/2013 | Yang et al. |
| 8,501,537 B2 | 8/2013 | Sadaka et al. |
| 8,524,533 B2 | 9/2013 | Tong et al. |
| 8,620,164 B2 | 12/2013 | Heck et al. |
| 8,647,987 B2 | 2/2014 | Yang et al. |
| 8,697,493 B2 | 4/2014 | Sadaka |
| 8,716,105 B2 | 5/2014 | Sadaka et al. |
| 8,728,934 B2 | 5/2014 | Uzoh et al. |
| 8,802,538 B1 | 8/2014 | Liu |
| 8,809,123 B2 | 8/2014 | Liu et al. |
| 8,841,002 B2 | 9/2014 | Tong |
| 8,988,299 B2 | 3/2015 | Kam et al. |
| 9,000,600 B2 | 4/2015 | Uzoh et al. |
| 9,028,755 B2 | 5/2015 | Itoh |
| 9,093,350 B2 | 7/2015 | Endo et al. |
| 9,123,703 B2 | 9/2015 | Uzoh et al. |
| 9,142,517 B2 | 9/2015 | Liu et al. |
| 9,171,756 B2 | 10/2015 | Enquist et al. |
| 9,184,125 B2 | 11/2015 | Enquist et al. |
| 9,190,345 B1 | 11/2015 | Chen et al. |
| 9,190,375 B2 | 11/2015 | Ayotte et al. |
| 9,224,704 B2 | 12/2015 | Landru |
| 9,230,941 B2 | 1/2016 | Chen et al. |
| 9,257,399 B2 | 2/2016 | Kuang et al. |
| 9,269,612 B2 | 2/2016 | Chen et al. |
| 9,299,736 B2 | 3/2016 | Chen et al. |
| 9,312,229 B2 | 4/2016 | Chen et al. |
| 9,318,385 B2 | 4/2016 | Uzoh et al. |
| 9,331,149 B2 | 5/2016 | Tong et al. |
| 9,337,235 B2 | 5/2016 | Chen et al. |
| 9,343,330 B2 | 5/2016 | Brusic et al. |
| 9,349,669 B2 | 5/2016 | Uzoh et al. |
| 9,368,866 B2 | 6/2016 | Yu |
| 9,385,024 B2 | 7/2016 | Tong et al. |
| 9,391,143 B2 | 7/2016 | Tong et al. |
| 9,394,161 B2 | 7/2016 | Cheng et al. |
| 9,431,368 B2 | 8/2016 | Enquist et al. |
| 9,433,093 B2 | 8/2016 | Uzoh |
| 9,437,572 B2 | 9/2016 | Chen et al. |
| 9,443,796 B2 | 9/2016 | Chou et al. |
| 9,461,007 B2 | 10/2016 | Chun et al. |
| 9,496,239 B1 | 11/2016 | Edelstein et al. |
| 9,536,848 B2 | 1/2017 | England et al. |
| 9,559,081 B1 | 1/2017 | Lai et al. |
| 9,620,481 B2 | 4/2017 | Edelstein et al. |
| 9,633,971 B2 | 4/2017 | Uzoh |
| 9,656,852 B2 | 5/2017 | Cheng et al. |
| 9,666,573 B1 | 5/2017 | Sukekawa |
| 9,723,716 B2 | 8/2017 | Meinhold |
| 9,728,521 B2 | 8/2017 | Tsai et al. |
| 9,741,620 B2 | 8/2017 | Uzoh et al. |
| 9,776,270 B2 | 10/2017 | Ayotte et al. |
| 9,799,587 B2 | 10/2017 | Fujii et al. |
| 9,852,988 B2 | 12/2017 | Enquist et al. |
| 9,881,882 B2 | 1/2018 | Hsu et al. |
| 9,893,004 B2 | 2/2018 | Yazdani |
| 9,899,442 B2 | 2/2018 | Katkar |
| 9,929,050 B2 | 3/2018 | Lin |
| 9,941,241 B2 | 4/2018 | Edelstein et al. |
| 9,941,243 B2 | 4/2018 | Kim et al. |
| 9,953,941 B2 | 4/2018 | Enquist |
| 9,960,142 B2 | 5/2018 | Chen et al. |
| 10,002,844 B1 | 6/2018 | Wang et al. |

(56) References Cited

U.S. PATENT DOCUMENTS

| | | |
|---|---|---|
| 10,026,605 B2 | 7/2018 | Doub et al. |
| 10,075,657 B2 | 9/2018 | Fahim et al. |
| 10,147,641 B2 | 12/2018 | Enquist et al. |
| 10,204,893 B2 | 2/2019 | Uzoh et al. |
| 10,262,963 B2 | 4/2019 | Enquist |
| 10,269,708 B2 | 4/2019 | Enquist et al. |
| 10,269,756 B2 | 4/2019 | Uzoh |
| 10,276,619 B2 | 4/2019 | Kao et al. |
| 10,276,909 B2 | 4/2019 | Huang et al. |
| 10,314,175 B2 | 6/2019 | Sato et al. |
| 10,418,277 B2 | 9/2019 | Cheng et al. |
| 10,434,749 B2 | 10/2019 | Tong et al. |
| 10,446,456 B2 | 10/2019 | Shen et al. |
| 10,446,487 B2 | 10/2019 | Huang et al. |
| 10,446,532 B2 | 10/2019 | Uzoh et al. |
| 10,508,030 B2 | 12/2019 | Katkar et al. |
| 10,515,913 B2 | 12/2019 | Katkar et al. |
| 10,522,499 B2 | 12/2019 | Enquist et al. |
| 10,707,087 B2 | 7/2020 | Uzoh et al. |
| 10,784,191 B2 | 9/2020 | Huang et al. |
| 10,790,262 B2 | 9/2020 | Uzoh et al. |
| 10,840,135 B2 | 11/2020 | Uzoh |
| 10,840,205 B2 | 11/2020 | Fountain, Jr. et al. |
| 10,854,578 B2 | 12/2020 | Morein |
| 10,879,212 B2 | 12/2020 | Uzoh et al. |
| 10,886,177 B2 | 1/2021 | DeLaCruz et al. |
| 10,892,246 B2 | 1/2021 | Uzoh |
| 10,908,173 B2 | 2/2021 | Yamasaki et al. |
| 10,923,408 B2 | 2/2021 | Huang et al. |
| 10,923,413 B2 | 2/2021 | DeLaCruz |
| 10,937,755 B2 | 3/2021 | Shah et al. |
| 10,950,547 B2 | 3/2021 | Mohammed et al. |
| 10,964,664 B2 | 3/2021 | Mandalapu et al. |
| 10,985,133 B2 | 4/2021 | Uzoh |
| 10,991,804 B2 | 4/2021 | DeLaCruz et al. |
| 10,998,292 B2 | 5/2021 | Lee et al. |
| 11,004,757 B2 | 5/2021 | Katkar et al. |
| 11,011,494 B2 | 5/2021 | Gao et al. |
| 11,011,503 B2 | 5/2021 | Wang et al. |
| 11,031,285 B2 | 6/2021 | Katkar et al. |
| 11,056,348 B2 | 7/2021 | Theil |
| 11,088,099 B2 | 8/2021 | Katkar et al. |
| 11,127,738 B2 | 9/2021 | DeLaCruz et al. |
| 11,158,606 B2 | 10/2021 | Gao et al. |
| 11,171,117 B2 | 11/2021 | Gao et al. |
| 11,176,450 B2 | 11/2021 | Teig et al. |
| 11,244,920 B2 | 2/2022 | Uzoh |
| 11,256,004 B2 | 2/2022 | Haba et al. |
| 11,264,357 B1 | 3/2022 | DeLaCruz et al. |
| 11,276,676 B2 | 3/2022 | Enquist et al. |
| 11,329,034 B2 | 5/2022 | Tao et al. |
| 11,348,898 B2 | 5/2022 | DeLaCruz et al. |
| 11,355,443 B2 | 6/2022 | Huang et al. |
| 11,515,279 B2 | 11/2022 | Uzoh et al. |
| 11,769,747 B2 | 9/2023 | Sawada et al. |
| 11,908,739 B2 | 2/2024 | Uzoh |
| 12,046,571 B2 | 7/2024 | Uzoh et al. |
| 12,100,676 B2 | 9/2024 | Uzoh et al. |
| 12,132,020 B2 | 10/2024 | Uzoh et al. |
| 12,154,880 B2 | 11/2024 | Uzoh |
| 2002/0000328 A1 | 1/2002 | Motomura et al. |
| 2002/0003307 A1 | 1/2002 | Suga |
| 2002/0025665 A1 | 2/2002 | Juengling |
| 2002/0047208 A1 | 4/2002 | Uzoh et al. |
| 2002/0074670 A1 | 6/2002 | Suga |
| 2002/0094661 A1 | 7/2002 | Enquist et al. |
| 2003/0092220 A1 | 5/2003 | Akram |
| 2003/0157748 A1 | 8/2003 | Kim et al. |
| 2004/0052390 A1 | 3/2004 | Morales et al. |
| 2004/0052930 A1 | 3/2004 | Basol et al. |
| 2004/0084414 A1 | 5/2004 | Sakai et al. |
| 2004/0238492 A1 | 12/2004 | Catabay et al. |
| 2006/0024950 A1 | 2/2006 | Choi et al. |
| 2006/0057945 A1 | 3/2006 | Hsu et al. |
| 2006/0220197 A1 | 10/2006 | Kobrinsky et al. |
| 2007/0096294 A1 | 5/2007 | Ikeda et al. |
| 2007/0111386 A1 | 5/2007 | Kim et al. |
| 2008/0073795 A1 | 3/2008 | Kohl et al. |
| 2008/0122092 A1 | 5/2008 | Hong |
| 2008/0237053 A1 | 10/2008 | Andricacos et al. |
| 2009/0197408 A1 | 8/2009 | Lehr et al. |
| 2009/0200668 A1 | 8/2009 | Yang et al. |
| 2010/0255262 A1 | 10/2010 | Chen et al. |
| 2010/0327443 A1 | 12/2010 | Kim |
| 2011/0074040 A1 | 3/2011 | Frank et al. |
| 2011/0076787 A1 | 3/2011 | Ahmad et al. |
| 2011/0084403 A1 | 4/2011 | Yang et al. |
| 2012/0211894 A1 | 8/2012 | Aoyagi |
| 2012/0212384 A1 | 8/2012 | Kam et al. |
| 2013/0009321 A1 | 1/2013 | Kagawa et al. |
| 2013/0020704 A1 | 1/2013 | Sadaka |
| 2013/0221527 A1 | 8/2013 | Yang et al. |
| 2013/0252399 A1 | 9/2013 | Leduc |
| 2014/0153210 A1 | 6/2014 | Uzoh |
| 2014/0175655 A1 | 6/2014 | Chen et al. |
| 2014/0191418 A1 | 7/2014 | Cheng et al. |
| 2014/0225258 A1 | 8/2014 | Chiu et al. |
| 2014/0225795 A1 | 8/2014 | Yu |
| 2014/0252635 A1 | 9/2014 | Tran et al. |
| 2014/0264948 A1 | 9/2014 | Chou et al. |
| 2014/0353828 A1 | 12/2014 | Edelstein et al. |
| 2015/0064498 A1 | 3/2015 | Tong |
| 2015/0108644 A1 | 4/2015 | Kuang et al. |
| 2015/0206823 A1 | 7/2015 | Lin et al. |
| 2015/0206840 A1 | 7/2015 | Lin et al. |
| 2015/0279888 A1 | 10/2015 | Chen et al. |
| 2015/0340269 A1 | 11/2015 | Rivoire et al. |
| 2015/0364434 A1 | 12/2015 | Chen et al. |
| 2015/0380368 A1 | 12/2015 | Momose et al. |
| 2016/0020183 A1 | 1/2016 | Chuang et al. |
| 2016/0133598 A1 | 5/2016 | Baudin et al. |
| 2016/0276383 A1 | 9/2016 | Chuang et al. |
| 2016/0343682 A1 | 11/2016 | Kawasaki |
| 2017/0025381 A1 | 1/2017 | Tsai et al. |
| 2017/0047307 A1 | 2/2017 | Uzoh |
| 2017/0069575 A1 | 3/2017 | Haba et al. |
| 2017/0086320 A1 | 3/2017 | Barber |
| 2017/0141079 A1 | 5/2017 | Kao et al. |
| 2017/0194271 A1 | 7/2017 | Hsu et al. |
| 2017/0271242 A1 | 9/2017 | Lo et al. |
| 2017/0330855 A1 | 11/2017 | Tung et al. |
| 2017/0355040 A1 | 12/2017 | Utsumi et al. |
| 2018/0151523 A1 | 5/2018 | Chen et al. |
| 2018/0175012 A1 | 6/2018 | Wu et al. |
| 2018/0182639 A1 | 6/2018 | Uzoh et al. |
| 2018/0182665 A1 | 6/2018 | Uzoh et al. |
| 2018/0182666 A1 | 6/2018 | Uzoh et al. |
| 2018/0190580 A1 | 7/2018 | Haba et al. |
| 2018/0190583 A1 | 7/2018 | DeLaCruz et al. |
| 2018/0219038 A1 | 8/2018 | Gambino et al. |
| 2018/0273377 A1 | 9/2018 | Katkar et al. |
| 2018/0295718 A1 | 10/2018 | Uzoh et al. |
| 2018/0323177 A1 | 11/2018 | Yu et al. |
| 2018/0323227 A1 | 11/2018 | Zhang et al. |
| 2018/0331066 A1 | 11/2018 | Uzoh et al. |
| 2018/0350674 A1 | 12/2018 | Uzoh |
| 2019/0096741 A1 | 3/2019 | Uzoh et al. |
| 2019/0115277 A1 | 4/2019 | Yu et al. |
| 2019/0131277 A1 | 5/2019 | Yang et al. |
| 2019/0198407 A1 | 6/2019 | Huang et al. |
| 2019/0198409 A1 | 6/2019 | Katkar et al. |
| 2019/0244909 A1 | 8/2019 | Chiu et al. |
| 2019/0265411 A1 | 8/2019 | Huang et al. |
| 2019/0295954 A1 | 9/2019 | Nomura et al. |
| 2019/0319007 A1 | 10/2019 | Uzoh et al. |
| 2019/0333550 A1 | 10/2019 | Fisch |
| 2019/0348336 A1 | 11/2019 | Katkar et al. |
| 2019/0385935 A1 | 12/2019 | Gao et al. |
| 2019/0385966 A1 | 12/2019 | Gao et al. |
| 2019/0393086 A1 | 12/2019 | Uzoh |
| 2020/0006280 A1 | 1/2020 | Shah et al. |
| 2020/0013637 A1 | 1/2020 | Haba |
| 2020/0013765 A1 | 1/2020 | Fountain, Jr. et al. |
| 2020/0035641 A1 | 1/2020 | Fountain, Jr. et al. |

(56) References Cited

U.S. PATENT DOCUMENTS

| | | |
|---|---|---|
| 2020/0075520 A1 | 3/2020 | Gao et al. |
| 2020/0075534 A1 | 3/2020 | Gao et al. |
| 2020/0075553 A1 | 3/2020 | DeLaCruz et al. |
| 2020/0098711 A1 | 3/2020 | Choi et al. |
| 2020/0126906 A1 | 4/2020 | Uzoh et al. |
| 2020/0194396 A1 | 6/2020 | Uzoh |
| 2020/0227367 A1 | 7/2020 | Haba et al. |
| 2020/0243380 A1 | 7/2020 | Uzoh et al. |
| 2020/0279821 A1 | 9/2020 | Haba et al. |
| 2020/0294908 A1 | 9/2020 | Haba et al. |
| 2020/0328162 A1 | 10/2020 | Haba et al. |
| 2020/0328164 A1 | 10/2020 | DeLaCruz et al. |
| 2020/0328165 A1 | 10/2020 | DeLaCruz et al. |
| 2020/0335408 A1 | 10/2020 | Gao et al. |
| 2020/0365575 A1 | 11/2020 | Uzoh et al. |
| 2020/0371154 A1 | 11/2020 | DeLaCruz et al. |
| 2020/0381389 A1 | 12/2020 | Uzoh et al. |
| 2020/0395321 A1 | 12/2020 | Katkar et al. |
| 2020/0411483 A1 | 12/2020 | Uzoh et al. |
| 2021/0028136 A1 | 1/2021 | Said et al. |
| 2021/0028144 A1 | 1/2021 | Lu |
| 2021/0098411 A1 | 4/2021 | Liff et al. |
| 2021/0098412 A1 | 4/2021 | Haba et al. |
| 2021/0118864 A1 | 4/2021 | DeLaCruz et al. |
| 2021/0143125 A1 | 5/2021 | DeLaCruz et al. |
| 2021/0181510 A1 | 6/2021 | Katkar et al. |
| 2021/0193603 A1 | 6/2021 | Katkar et al. |
| 2021/0193624 A1 | 6/2021 | DeLaCruz et al. |
| 2021/0193625 A1 | 6/2021 | DeLaCruz et al. |
| 2021/0234070 A1 | 7/2021 | Brueck et al. |
| 2021/0242050 A1 | 8/2021 | Chiu |
| 2021/0242152 A1 | 8/2021 | Fountain, Jr. et al. |
| 2021/0257333 A1* | 8/2021 | Yan ..................... H01L 24/80 |
| 2021/0296282 A1 | 9/2021 | Gao et al. |
| 2021/0305202 A1 | 9/2021 | Uzoh et al. |
| 2021/0335737 A1 | 10/2021 | Katkar et al. |
| 2021/0366820 A1 | 11/2021 | Uzoh |
| 2021/0407941 A1 | 12/2021 | Haba |
| 2022/0077063 A1 | 3/2022 | Haba |
| 2022/0077087 A1 | 3/2022 | Haba |
| 2022/0130787 A1 | 4/2022 | Uzoh |
| 2022/0139867 A1 | 5/2022 | Uzoh |
| 2022/0139869 A1 | 5/2022 | Gao et al. |
| 2022/0139975 A1 | 5/2022 | Kimura et al. |
| 2022/0149002 A1 | 5/2022 | Hou et al. |
| 2022/0157752 A1 | 5/2022 | Bourjot et al. |
| 2022/0165692 A1 | 5/2022 | Uzoh et al. |
| 2022/0208650 A1 | 6/2022 | Gao et al. |
| 2022/0208702 A1 | 6/2022 | Uzoh |
| 2022/0208723 A1 | 6/2022 | Katkar et al. |
| 2022/0246497 A1 | 8/2022 | Fountain, Jr. et al. |
| 2022/0285303 A1 | 9/2022 | Mirkarimi et al. |
| 2022/0319901 A1 | 10/2022 | Suwito et al. |
| 2022/0320035 A1 | 10/2022 | Uzoh et al. |
| 2022/0320036 A1 | 10/2022 | Gao et al. |
| 2023/0005849 A1 | 1/2023 | Chuang |
| 2023/0005850 A1 | 1/2023 | Fountain, Jr. |
| 2023/0019869 A1 | 1/2023 | Mirkarimi et al. |
| 2023/0036441 A1 | 2/2023 | Haba et al. |
| 2023/0067677 A1 | 3/2023 | Lee et al. |
| 2023/0069183 A1 | 3/2023 | Haba |
| 2023/0100032 A1 | 3/2023 | Haba et al. |
| 2023/0115122 A1 | 4/2023 | Uzoh et al. |
| 2023/0122531 A1 | 4/2023 | Uzoh |
| 2023/0123423 A1 | 4/2023 | Gao et al. |
| 2023/0125395 A1 | 4/2023 | Gao et al. |
| 2023/0130259 A1 | 4/2023 | Haba et al. |
| 2023/0132632 A1 | 5/2023 | Katkar et al. |
| 2023/0140107 A1 | 5/2023 | Uzoh et al. |
| 2023/0142680 A1 | 5/2023 | Guevara et al. |
| 2023/0154816 A1 | 5/2023 | Haba et al. |
| 2023/0154828 A1 | 5/2023 | Haba et al. |
| 2023/0187264 A1 | 6/2023 | Uzoh et al. |
| 2023/0187317 A1 | 6/2023 | Uzoh |
| 2023/0187412 A1 | 6/2023 | Gao et al. |
| 2023/0197453 A1 | 6/2023 | Fountain, Jr. et al. |
| 2023/0197496 A1 | 6/2023 | Theil |
| 2023/0197559 A1 | 6/2023 | Haba et al. |
| 2023/0197560 A1 | 6/2023 | Katkar et al. |
| 2023/0197655 A1 | 6/2023 | Theil et al. |
| 2023/0207402 A1 | 6/2023 | Fountain, Jr. et al. |
| 2023/0207437 A1 | 6/2023 | Haba |
| 2023/0207474 A1 | 6/2023 | Uzoh et al. |
| 2023/0207514 A1 | 6/2023 | Gao et al. |
| 2023/0215836 A1 | 7/2023 | Haba et al. |
| 2023/0245950 A1 | 8/2023 | Haba et al. |
| 2023/0268300 A1 | 8/2023 | Uzoh et al. |
| 2023/0299029 A1 | 9/2023 | Theil et al. |
| 2023/0343734 A1 | 10/2023 | Uzoh et al. |
| 2023/0360950 A1 | 11/2023 | Gao |
| 2023/0361074 A1 | 11/2023 | Uzoh et al. |
| 2023/0369136 A1 | 11/2023 | Uzoh et al. |
| 2023/0375613 A1 | 11/2023 | Haba et al. |
| 2024/0038702 A1 | 2/2024 | Uzoh |
| 2024/0055407 A1 | 2/2024 | Workman et al. |
| 2024/0079376 A1 | 3/2024 | Suwito et al. |
| 2024/0105674 A1 | 3/2024 | Uzoh et al. |
| 2024/0113059 A1 | 4/2024 | Uzoh et al. |
| 2024/0170411 A1 | 5/2024 | Chang et al. |
| 2024/0186248 A1 | 6/2024 | Haba et al. |
| 2024/0186268 A1 | 6/2024 | Uzoh et al. |
| 2024/0186269 A1 | 6/2024 | Haba |
| 2024/0203917 A1 | 6/2024 | Katkar et al. |
| 2024/0213191 A1 | 6/2024 | Theil et al. |
| 2024/0213210 A1 | 6/2024 | Haba et al. |
| 2024/0222239 A1 | 7/2024 | Gao et al. |
| 2024/0222315 A1 | 7/2024 | Uzoh |
| 2024/0222319 A1 | 7/2024 | Gao et al. |
| 2024/0266255 A1 | 8/2024 | Haba et al. |
| 2024/0298454 A1 | 9/2024 | Haba |
| 2024/0304593 A1 | 9/2024 | Uzoh |
| 2024/0312951 A1 | 9/2024 | Theil et al. |
| 2024/0332184 A1 | 10/2024 | Katkar et al. |
| 2024/0332227 A1 | 10/2024 | Uzoh et al. |
| 2024/0332231 A1 | 10/2024 | Uzoh |
| 2024/0332267 A1 | 10/2024 | Haba et al. |
| 2024/0387419 A1 | 11/2024 | Mrozek et al. |
| 2025/0004197 A1 | 1/2025 | Haba et al. |
| 2025/0006632 A1 | 1/2025 | Chang et al. |
| 2025/0006642 A1 | 1/2025 | Haba et al. |
| 2025/0006674 A1 | 1/2025 | Uzoh et al. |
| 2025/0006679 A1 | 1/2025 | Theil et al. |
| 2025/0006689 A1 | 1/2025 | Uzoh et al. |
| 2025/0022752 A1 | 1/2025 | Uzoh |
| 2025/0054854 A1 | 2/2025 | Katkar et al. |
| 2025/0079364 A1 | 3/2025 | Uzoh et al. |
| 2025/0087616 A1 | 3/2025 | Uzoh |
| 2025/0096172 A1 | 3/2025 | Uzoh et al. |
| 2025/0096191 A1 | 3/2025 | Gao et al. |
| 2025/0112123 A1 | 4/2025 | Katkar et al. |
| 2025/0185163 A1 | 6/2025 | Zhao et al. |
| 2025/0210585 A1 | 6/2025 | Fountain, Jr. et al. |
| 2025/0212554 A1 | 6/2025 | Katkar et al. |
| 2025/0218903 A1 | 7/2025 | Uzoh et al. |

FOREIGN PATENT DOCUMENTS

| | | |
|---|---|---|
| CN | 106711131 A | 5/2017 |
| CN | 107256852 B | 9/2019 |
| JP | 2000-183061 | 6/2000 |
| JP | 2002-353416 A | 12/2002 |
| JP | 2013-033786 A | 2/2013 |
| JP | 2016-21497 A | 2/2016 |
| JP | 2018-129475 | 8/2018 |
| JP | 2018-160519 | 10/2018 |
| KR | 10-2008-0050129 | 6/2008 |
| KR | 10-2016-0066272 | 6/2016 |
| WO | WO 2005/043584 A2 | 5/2005 |

(56) References Cited

FOREIGN PATENT DOCUMENTS

| WO | WO 2009/021266 A1 | 2/2009 |
|----|----|----|
| WO | WO 2022/147429 A1 | 7/2022 |

OTHER PUBLICATIONS

Chiu et al., "Low-Temperature Wafer-to-Wafer Hybrid Bonding by Nanocrystalline Copper". In 2022 IEEE 72nd Electronic Components and Technology Conference (ECTC) May 31, 2022 (pp. 679-684).
Ericson et al., A transmission electron microscopy study of hillocks in Thin Aluminum Films. J Vac Sci Technol. B: Jan. 1, 1991;9(1): 58-63.
Hu et al., "Two-Step Ar/$N_2$ Plasma-Activated Al Surface for Al—Al Direct Bonding". In 2022 IEEE 72nd Electronic Components and Technology Conference (ECTC) May 31, 2022 (pp. 324-329); doi: 10.1109/ECTC51906.2022.00060.
Hwang et al., "A Model for Hillock Growth in Al Thin Films Controlled by Plastic Deformation". Acta Materialia. Sep. 1, 2007;55(15): 5297-5301.
Hwang et al., "Effect of Film Thickness and Annealing Temperature on Hillock Distributions in Pure Al Films". Scripta materialia. Jan. 1, 2007;56(1): 17-20.
Iwamura et al., "Effect of Aluminium Oxide Caps on Hillock Formation in Aluminum Allow Films". Thin Solid Films. Jul. 30, 1999;349(1-2): 191-198.
Mori E., "Suppression of Byproduct Accumulation in Rechargeable Aluminum—Air Batteries Using Non-Oxide Ceramic Materials as Air Cathode Materials". Sustainable Energy & Fuels. 2017;1(5): 1082-1089.
Rebhan et al., "Low-Temperature Aluminum-Aluminum Wafer Bonding". ECS Transactions. Aug. 24, 2016;75(9): 15; 10 pages.
Santoro C.J., "Thermal Cycling and Surface Reconstruction in Aluminum Thin Films". Journal of the Electrochemical Society. Mar. 1, 1969;116(3):361-364.
International Search Report and Written Opinion for PCT/US2023/084420, dated Apr. 12, 2024, 11 pages.
Akolkar, R., "Current status and advances in Damascene Electrodeposition," Encyclopedia of Interfacial Chemistry: Surface Science and Electrochemistry, 2017, 8 pages.
Basol et al., "Electrochemical mechanical deposition (ECMDT technique for semiconductor interconnect applications," Microelectronic Engineering, 2002, vol. 64, pp. 43-51.
Basol et al., "Planar copper plating and electropolishing techniques, "Chemical Engineering Communication, Jul. 2006, 14 pages.
Basol et al., "Study on the Mechanism of Electrochemical Mechanical Deposition of Copper Layers," Nu Tool Inc., 1655 McCandless Drive, Milpitas, CA 95035, Electrochemical Processes in ULSI and MEMS, Proceedings of the International Symposium; Proceedings vol. 2004-17, pp. 155-160.
Bush, Steve, "Electronica: Automotive power modules from On Semi," ElectronicsWeekly.com, indicating an Onsemi AR0820 product was to be demonstrated at a Nov. 2018 trade show, https://www.electronicsweekly.com/news/products/power-supplies/electronica-automotive-power-modules-semi-2018-11/ (published Nov. 8, 2018; downloaded Jul. 26, 2023).
Che, F.X. et al., "Study on Cu protrusion of through-silicon via," IEEE Transactions on Components, Packaging and Manufacturing Technology, May 2013, vol. 3, No. 5, pp. 732-739.
Dela Pena, Eden M. et al., "Electrodeposited copper using direct and pulse currents from electrolytes containing low concentration of additives," School of Chemical and Process Engineering, University of Strathclyde, 2018 Surface and Coating Technology, 40 pages.
De Messemaeker, Joke et al., "Correlation between Cu microstructure and TSV Cu pumping," 2014 Electronic Components & Technology Conference, pp. 613-619.
Di Cioccio, L. et al., "An overview of patterned metal/dielectric surface bonding: Mechanism, alignment and characterization," Journal of The Electrochemical Society, 2011, vol. 158, No. 6, pp. P81-P86.
Ganesan, Kousik, "Capable copper electrodeposition process for integrated circuit—substrate packaging manufacturing," A dissertation presented in partial fulfillment of the requirments for the degree Doctor of Philosophy, Arizona State University, May 2018, 320 pages.
Gondcharton, P. et al., "Kinetics of low temperature direct copper-copper bonding," Microsyst Technol, 2015, vol. 21, pp. 995-1001.
Heryanto, A. et al., "Effect of copper TSV annealing on via protrustion for TSV wafer fabrication," Journal of Electronic Materials, 2012, vol. 41, No. 9, pp. 2533-2542.
Hobbs, Anthony et al., "Evolution of grain and micro-void structure in electroplated copper interconnects," Materials Transactions, 2002, vol. 43, No. 7, pp. 1629-1632.
Huang, Q., "Effects of impurity elements on isothermal grain growth of electroplated copper," Journal of The Electrochemical Society, 2018, vol. 165, No. 7, pp. D251-D257.
Huang, Q., "Impurities in the electroplated sub-50 nm Cu lines: The effects of the plating additives," Journal of The Electrochemical Society, 2014, vol. 161, No. 9, pp. D388-D394.
Jiang, T. et al., "Plasticity mechanism for copper extrusion in through-silicon vias for three-dimensional interconnects," Applied Physics Letters, 2013, vol. 103, pp. 211906-1-211906-5.
Juang, Jing-Ye et al., "Copper-to-copper direct bonding on highly (111)-oriented nanotwinned copper in no-vacuum ambient," Scientific Reports, Sep. 17, 2018, vol. 8, 11 pages.
Ker, Ming-Dou et al., "Fully process-compatible layout design on bond pad to improve wire bond reliability in CMOS lcs," IEEE Transactions on Components and Packaging Technologies, Jun. 2002, vol. 25, No. 2, pp. 309-316.
Khan, Muhammed et al., "Damascene Process and Chemical Mechanical Planarization," http://www.ece.umd.edu/class/enee416/GroupActivities/Damascene%20Presentation.pdf, 25 pages.
Kim, Myung Jun et al., "Characteristics of pulse-reverse electrodeposited Cu thin film," I. Effects of Anodic Step in the Absence of an Organic Additives, Journal of The Electrochemical Society, 2012, vol. 159, No. 9, pp. D538-D543.
Kim, Myung Jun et al., "Characteristics of pulse-reverse electrodeposited Cu thin film," II. Effects of Organic Additives, Journal of The Electrochemical Society, 2012, vol. 159, No. 9, pp. D544-D548.
Liu, C. et al., "Low-temperature direct copper-to-copper bonding enabled by creep on (111) surfaces of nanotwinned Cu," Scientific Reports, May 12, 2015, 5:09734, pp. 1-11.
Liu, Chien-Min et al., "Effect of grain orientations of Cu seed layers on the growth of <111>-oriented nanotwinned Cu," Scientific Reports, 2014, vol. 4, No. 6123, 4 pages.
Liu, Zi-Yu et al. "Detection and formation mechanism of micro-defects in ultrafine pitch Cu-Cu direct bonding," Chin. Phys. B, 2016, vol. 25, No. 1, pp. 018103-1-018103-7.
Lu, L. et al., "Grain growth and strain release in nanocrystalline copper," Journal of Applied Physics, vol. 89, Issue 11, pp. 6408.
Mendez, Julie Marie, "Characterization of copper electroplating and electropolishing processes for semiconductor interconnect metallization," Submitted in partial fulfillment of the requirements for the degree of Doctor of Philosophy, Department of Chemical Engineering, Case Western Reserve University, Aug. 2009, 140 pages.
Menk, L.A. et al., "Galvanostatic plating with a single additive electrolyte for bottom-up filling of copper in Mesoscale TSVs," Microsystems and Engineering Sciences Applications (MESA) Complex, Sandia National Laboratories, Albuquerque, New Mexico, 2019 J. Electrochem. Soc. 166, 17 pages.
Moriceau, H. et al., "Overview of recent direct wafer bonding advances and applications," Advances in Natural Sciences-Nanoscience and Nanotechnology, 2010, 11 pages.
Morrison, Jim et al., "Samsung Galaxy S7 Edge Teardown," Tech Insights (posted Apr. 24, 2016), includes description of hybrid bonded Sony IMX260 dual-pixel sensor, https://www.techinsights.com/blog/samsung-galaxy-s7-edge-teardown, downloaded Jul. 11, 2023, 9 pages.
Mott, D. et al., "Synthesis of size-controlled and shaped copper nanoparticles," Langmuir, 2007, vol. 23, No. 10, pp. 5740-5745.
Nakanishi, H. et al., "Studies on SiO2—SiO2 bonding with hydrofluoric acid. Room temperature and low stress bonding technique for MEMS," Sensors and Actuators, 2000, vol. 79, pp. 237-244.

(56) References Cited

OTHER PUBLICATIONS

Oberhammer, J. et al., "Sealing of adhesive bonded devices on wafer level," Sensors and Actuators A, 2004, vol. 110, No. 1-3, pp. 407-412, see pp. 407-412, and Figures 1(a)-1(l), 6 pages.

Onsemi AR0820 image, cross section of a CMOS image sensor product. The part in the image was shipped on Sep. 16, 2021. Applicant makes no representation that the part in the image isidentical to the part identified in the separately submitted reference BUSH, Nov. 8, 2018, ElectronicsWeekly.com ("BUSH article"); however, the imaged part and the part shown in the BUSH article share the part number "ONSEMI AR0820.".

Ortleb, Thomas et al., "Controlling macro and micro surface topography for a 45nm copper CMP process using a high resolution profiler," Proc. Of SPIE, 2008, vol. 6922, 11 pages.

Parthasaradhy, N.V., "Practical Electroplating Handbook," 1989, Prentice-Hall, Inc., pp. 54-56.

Plobi, A. et al., "Wafer direct bonding: tailoring adhesion between brittle materials," Materials Science and Engineering Review Journal, 1999, R25, 88 pages.

Roy, A. et al., "Annealing effects on the surface properties of Cu—TiC thin films," Materials Today: Proceedings, 2021, vol. 44, Part 1, pp. 170-175.

Saraswat, Stanford Presentation, Cu Interconnect slides, web page web.stanford.edu/class/ee311/NOTES/Cu_Interconnect_Slides.pdf, 19 pages.

Song, Xiaohui, "Atomic study of copper-copper bonding using nanoparticles," Journal of Electronic Packaging, Jun. 2020, vol. 142, 5 pages.

Song, Xiaoning, "Microstructure and mechanical properties of electrodeposited copper films," A thesis submitted to the College of Engineering and Physical Sciences of the University of Birmingham, 2011, web page etheses.bham.ac.uk/id/eprint/1764/, 111 pages.

Sony IMX260 image, a first cross section of Sony product labeled IMX260, showing a hybrid bonded back side illuminated CMOS image sensor with a pad opening for a wire bond. The second image shows a second cross-section with peripheral probe and wire bond pads in the bonded structure. The part in the images was shipped in Apr. 2016. Applicant makes no representation that the part in the images is identical to the part identified in the separately submitted reference Morrison et al. (Tech Insights article dated Apr. 24, 2016), describing and showing a similar sensor product within the Samsung Galaxy S7; however the imaged part and the part shown in the Morrison et al. article share the part name "SONY IMX260 image.".

Suga et al., "Bump-less interconnect for next generation system packaging," Electronic Components and Technology Conference, 2001, IEEE, pp. 1003-1008.

Suga, T., "Feasibility of surface activated bonding for ultra-fine pitch interconnection—A new concept of bump-less direct bonding for system level packaging, " The University of Tokyo, Research Center for Science and Technology, 2000 Electronic Components and Technology Conference, 2000 IEEE, pp. 702-705.

Swingle, Karen D., "Nanograin Copper Deposition Using an Impinging Jet Electrode," A Thesis submitted in partial satisfaction of the requirements of the degree of Master of Science, University of California, San Diego, 2013, 102 pages.

Takahashi, K. et al., "Transport phenomena that control electroplated copper filling of submicron vias and trenches," Journal of The Electrochemical Society, 1999, vol. 146, No. 12, pp. 4499-4503.

Zheng, Z. et al., "Study of grain size effect of Cu metallization on interfacial microstructures of solder joints," Microelectronics Reliability, 2019, vol. 99, pp. 44-51.

Zik, N. et al., "Thermally produced nano catalyst for biodiesel production: A review," Journal of Advanced Research in Fluid Mechanics and Thermal Sciences, 2018, vol. 52, Issue 2, pp. 139-147.

Chen et al., "Wafer Level Bonding Using Localized Radio-Frequency Induction Heating". Science China Technological Sciences. May 2010;53: 1252-1257.

CLASSONE Technologies, "Copper RDL Plating—Using the Solstice® CopperMax™ Reactor," downloaded from https://classone.com/electroplating/copper-rdl-plating/ on Sep. 11, 2024; 3 pages.

Das et al., "Theory of welding of metallic parts in microwave cavity applicator," Fundamental J. Modern Physics. 2012;3(2): 125-155.

Diehm et al., "Low temperature processing of highly integrated assemblies by selective microwave heating". 2006 1st Electronic Systemintegration Technology Conference, Dresden, Germany, 2006, pp. 608-611, doi: 10.1109/ESTC.2006.280066.

Hofmann et al., "Localized Induction Heating of Cu—Sn Layers for Rapid Solid-Liquid Interdiffusion Bonding Based on Miniaturized Coils," Micromachines. Aug. 12, 2022;13(8):1307 in 24 pages.

Iwai, T. et al., "Influence of microwave annealing on optical and electrical properties of plasma-induced defect structures in Si substrate," Journal of Vacuum Science & Technology A, 2015, vol. 33, Issue 6, pp. 061403-1-061403-9.

Kimura, M. et al., "Investigation of implantation damage recovery using microwave annealing for high performance image sensing devices," ITE Trans. on MTA, 2016, vol. 4, No. 2, pp. 85-90.

Kowalski et al., "Microwave annealing for low temperature activation". In 2007 15th International Conference on Advanced Thermal Processing of Semiconductors Oct. 2, 2007 (pp. 51-56). IEEE.

Lee, I.K. et al., "Microwave annealing effect for highly reliable biosensor: dual-gate ion- sensitive field-effect transistor using amorphous InGaZnO thin-film transistor," ACS Appl Mater Interfaces, Dec. 2014, vol. 6, No. 24, pp. 22680-22686.

Pankratov, E.L., "Redistribution of dopant during microwave annealing of a multilayer structure for production p—n junction," Journal of Applied Physics, 2008, vol. 103, Issue 6, pp. 064320-1-064320-10.

Zhang, Q.X. et al., "The effects of rapid thermal annealing and microwave annealing on the electrical properties of ZrO2 metal-insulator-metal capacitors," Optik, Feb. 2019, vol. 179, pp. 1057-1062.

* cited by examiner

DIRECTLY BONDED METAL STRUCTURES HAVING OXIDE LAYERS THEREIN

BACKGROUND

Field

The field relates to bonded structures and methods of forming direct metal bonds that include aluminum features, and, in particular to bonded structures bonded using hillock formation.

Description of the Related Art

Microelectronic elements, such as integrated device dies or chips, may be mounted or stacked on other elements thereby forming a bonded structure. Direct metal bonding can be conducted at low temperatures and without external pressure. For example, direct hybrid bonding involves directly bonding non-conductive features (e.g., inorganic dielectrics) of different elements together, without intervening adhesives, while also directly bonding conductive features (e.g., metal pads or lines) of the elements together. For example, a microelectronic element can be mounted to a carrier, such as an interposer, a reconstituted wafer or element, etc. As another example, a microelectronic element can be stacked on top of another microelectronic element, e.g., a first integrated device die can be stacked on a second integrated device die. Each of the microelectronic elements can have conductive pads for mechanically and electrically bonding the elements to one another. There is a continuing need for improved methods for forming the bonded structure.

BRIEF DESCRIPTION OF THE DRAWINGS

Specific implementations will now be described with reference to the following drawings, which are provided by way of example, and not limitation.

DETAILED DESCRIPTION

Figure 1A:
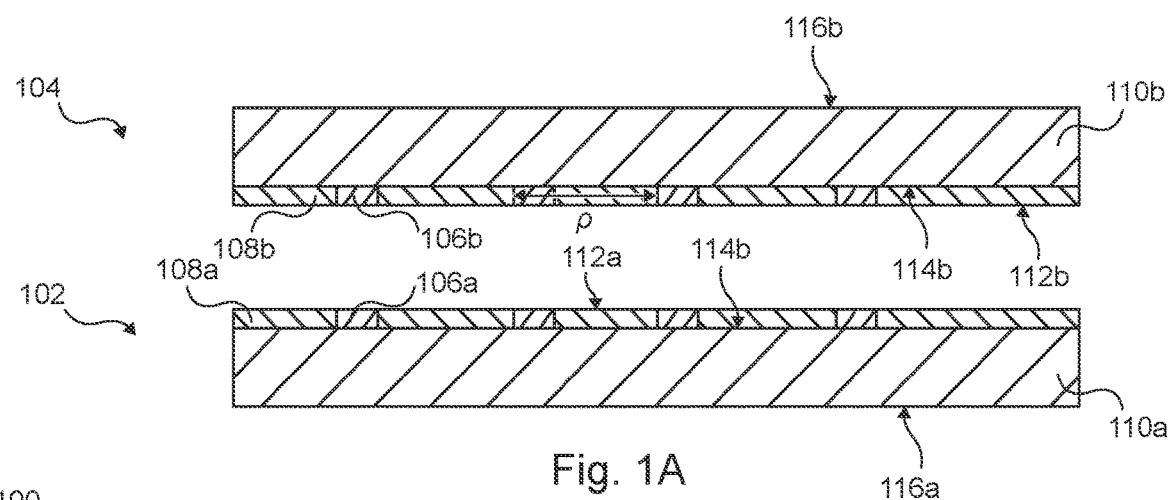
FIG. 1A is a schematic cross-sectional side view of two elements prior to direct hybrid bonding.
Figure 1B:
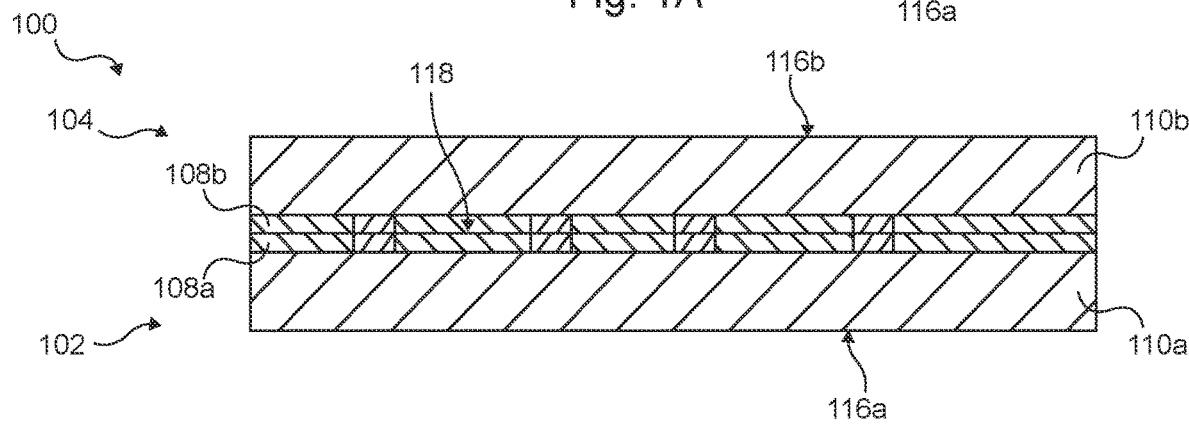
FIG. 1B is a schematic cross-sectional side view of the two elements shown in FIG. 1A after direct hybrid bonding.

Various embodiments disclosed herein relate to directly bonded structures in which two or more elements can be directly bonded to one another without an intervening adhesive. FIGS. 1A and 1B schematically illustrate a process for forming a directly hybrid bonded structure without an intervening adhesive according to some embodiments. In FIGS. 1A and 1B, a bonded structure 100 comprises first and second elements 102 and 104 that can be directly bonded to one another at a bond interface 118 without an intervening adhesive. Two or more microelectronic elements 102 and 104 (such as semiconductor elements, including, for example, integrated device dies, wafers, passive devices, individual active devices such as power switches, etc.) may be stacked on or bonded to one another to form the bonded structure 100. Conductive features 106a (e.g., contact pads, exposed ends of vias or through substrate vias (TSVs), elongated traces, etc.) of the first element 102 may be mechanically and electrically connected to corresponding conductive features 106b of the second element 104. Any suitable number of elements can be stacked in the bonded structure 100. For example, a third element (not shown) can be stacked on the second element 104, a fourth element (not shown) can be stacked on the third element, and so forth. Additionally or alternatively, one or more additional elements (not shown) can be stacked laterally adjacent one another along the first element 102. In some embodiments, the laterally adjacent additional stacked element(s) may be smaller than the second element. In some embodiments, the laterally adjacent additional stacked element(s) may be less than half the size of the second element in lateral dimensions.

In some embodiments, the elements 102 and 104 are directly bonded to one another without an adhesive. In various embodiments, a non-conductive field region that includes a non-conductive or dielectric material can serve as a first bonding layer 108a of the first element 102 which can be directly bonded to a corresponding non-conductive field region, which includes a non-conductive or dielectric material serving as a second bonding layer 108b of the second element 104, without an adhesive. The non-conductive bonding layers 108a and 108b can be disposed on respective front sides 114a and 114b of device portions 110a and 110b, such as a semiconductor (e.g., silicon) portion of the elements 102, 104. Active devices and/or circuitry can be patterned and/or otherwise disposed in or on the device portions 110a and 110b. Active devices and/or circuitry can be disposed at or near the front sides 114a and 114b of the device portions 110a and 110b, and/or at or near opposite backsides 116a and 116b of the device portions 110a and 110b. Bonding layers can be provided on front sides and/or back sides of the elements. The non-conductive material can be referred to as a non-conductive bonding region or bonding layer 108a of the first element 102. In some embodiments, the non-conductive bonding layer 108a of the first element 102 can be directly bonded to the corresponding non-conductive bonding layer 108b of the second element 104 using dielectric-to-dielectric bonding techniques. For example, non-conductive or dielectric-to-dielectric bonds may be formed without an adhesive using the direct bonding techniques disclosed at least in U.S. Pat. Nos. 9,564,414; 9,391,143; and 10,434,749, the entire contents of each of which are incorporated by reference herein in their entirety and for all purposes. It should be appreciated that in various embodiments, the bonding layers 108a and/or 108b can comprise a non-conductive material such as a dielectric material, for example, silicon oxide, or an undoped semiconductor material, for example undoped silicon. Suitable dielectric bonding surface or materials for direct bonding include but are not limited to inorganic dielectrics, such as silicon oxide, silicon nitride, or silicon oxynitride, and can include carbon, such as silicon carbide, silicon oxycarbonitride, low K dielectric materials, SiCOH dielectrics, silicon carbonitride or diamond-like carbon or a material comprising a diamond surface. Such carbon-containing materials, including ceramic materials, can be considered inorganic, despite the inclusion of carbon, unlike primarily hydrocarbon materials. In some embodiments, the dielectric materials do not comprise adhesive or polymer materials, such as epoxy, resin or molding materials. In some embodiments, including embodiments described hereinbelow, the dielectric bonding surfaces are defined by wafer-level processing of the underlying devices, such as the upper interlevel dielectric or passivation layers formed in back-end-of-line (BEOL) processing of an integrated circuit, and no separate bonding layer is deposited after formation of the underlying device.

In some embodiments, the device portions 110a and 110b can have significantly different coefficients of thermal expansion (CTEs) defining a heterogenous structure. The CTE difference between the device portions 110a and 110b, and particularly between bulk semiconductor, typically single crystal portions of the device portions 110a, 110b, can be greater than 5 ppm or greater than 10 ppm. For example, the CTE difference between the device portions 110a and 110b can be in a range of 5 ppm to 100 ppm, 5 ppm to 40 ppm, 10 ppm to 100 ppm, or 10 ppm to 40 ppm. In some embodiments, one of the device portions 110a and 110b can comprise optoelectronic single crystal materials, including perovskite materials, which are useful for optical piezoelectric or pyroelectric applications, and the other of the device portions 110a, 110b comprises a more conventional substrate material (Si, Ge, SiGe, III-V material, etc.). For example, one of the device portions 110a, 110b comprises lithium tantalate (LiTaO$_3$) or lithium niobate (LiNbO$_3$), and the other one of the device portions 110a, 110b comprises silicon (Si), quartz, fused silica glass, sapphire, or a glass. In other embodiments, one of the device portions 110a and 110b comprises a III-V single semiconductor material, such as gallium arsenide (GaAs) or gallium nitride (GaN), and the other one of the device portions 110a and 110b can comprise a non-III-V semiconductor material, such as silicon (Si) and/or germanium (Ge), or can comprise other materials with similar CTE, such as quartz, fused silica glass, sapphire, or a glass.

In various embodiments, direct hybrid bonds can be formed without an intervening adhesive. For example, non-conductive bonding surfaces 112a and 112b can be polished to a high degree of smoothness. The nonconductive bonding surfaces 112a and 112b can be polished using, for example, chemical mechanical polishing (CMP). The roughness of the polished bonding surfaces 112a and 112b can be less than 30 Å rms. For example, the roughness of the bonding surfaces 112a and 112b can be in a range of about 0.1 Å rms to 15 Å rms, 0.5 Å rms to 10 Årms, or 1 Å rms to 5 Å rms. The bonding surfaces 112a and 112b can be cleaned and exposed to a plasma and/or etchants to activate the surfaces 112a and 112b. In some embodiments, the surfaces 112a and 112b can be terminated with a species after activation or during activation (e.g., during the plasma and/or etch processes). Without being limited by theory, in some embodiments, the activation process can be performed to break chemical bonds at the bonding surfaces 112a and 112b, and the termination process can provide additional chemical species at the bonding surfaces 112a and 112b that improves the bonding energy during direct bonding. In some embodiments, the activation and termination are provided in the same step, e.g., a plasma to activate and terminate the surfaces 112a and 112b. In other embodiments, the bonding surfaces 112a and 112b can be terminated in a separate treatment to provide the additional species for direct bonding. In various embodiments, the terminating species can comprise nitrogen. For example, in some embodiments, the bonding surface(s) 112a, 112b can be exposed to a nitrogen-containing plasma. Thus, in the directly bonded structure 100, the bond interface 118 between two non-conductive materials (e.g., the bonding layers 108a and 108b) can comprise a very smooth interface with higher nitrogen content, higher oxygen content, or other terminating species, at the bond interface 118. Additional examples of activation and/or termination treatments may be found throughout U.S. Pat. Nos. 9,564,414; 9,391,143; and 10,434,749, the entire contents of each of which are incorporated by reference herein in their entirety and for all purposes. The roughness of the polished bonding surfaces 112a and 112b can be slightly rougher (e.g., about 1 Å rms to 30 Å rms, 3 Å rms to 20 Å rms, or possibly rougher) after an activation process.

In various embodiments, conductive features 106a of the first element 102 can also be directly bonded to corresponding conductive features 106b of the second element 104. For example, a direct hybrid bonding technique can be used to provide conductor-to-conductor direct bonds along the bond interface 118 that includes covalently direct bonded non-conductive-to-non-conductive (e.g., dielectric-to-dielectric) surfaces, prepared as described above. In various embodiments, the conductor-to-conductor (e.g., conductive feature 106a to conductive feature 106b) direct bonds and the dielectric-to-dielectric hybrid bonds can be formed using the direct bonding techniques similar to those disclosed at least in U.S. Pat. Nos. 9,716,033 and 9,852,988, the entire contents of each of which are incorporated by reference herein in their entirety and for all purposes. In direct hybrid bonding embodiments described herein, conductive features are provided within non-conductive bonding layers, and both conductive and nonconductive features are prepared for direct bonding, such as by the planarization, activation and/or termination treatments described above. Thus, the bonding surface prepared for direct bonding includes both conductive and non-conductive features. Specific additional preparation processes for directly bonding Al conductive features are described hereinbelow.

For example, non-conductive (e.g., dielectric) bonding surfaces 112a, 112b (for example, inorganic dielectric surfaces) can be prepared and directly bonded to one another without an intervening adhesive as explained above. Conductive contact features (e.g., conductive features 106a and 106b which may be partially or fully surrounded by non-conductive dielectric field regions within the bonding layers 108a, 108b) may also directly bond to one another without an intervening adhesive. In various embodiments, the conductive features 106a, 106b can comprise discrete pads or traces at least partially embedded in the non-conductive field regions. In some embodiments, the conductive contact features can comprise exposed contact surfaces of through substrate vias (e.g., through silicon vias (TSVs)). In some embodiments, the respective conductive features 106a and 106b can be recessed below exterior (e.g., upper) surfaces (non-conductive bonding surfaces 112a and 112b) of the dielectric field region or non-conductive bonding layers 108a and 108b. For example, for copper features, the respective conductive features 106a and 106b can be recessed by less than 30 nm, less than 20 nm, less than 15 nm, or less than 10 nm, for example, recessed in a range of 2 nm to 20 nm, or in a range of 4 nm to 10 nm. The non-conductive bonding layers 108a and 108b can be directly bonded to one another without an adhesive at room temperature in some embodiments and, subsequently, the bonded structure 100 can be annealed. Upon annealing, the conductive features 106a and 106b can expand and contact one another to form a metal-to-metal direct bond. Beneficially, the use of Direct Bond Interconnect, or DBI®, techniques commercially available from Adeia of San Jose, CA, can enable high density of conductive features 106a and 106b to be connected across the direct bond interface 118 (e.g., small or fine pitches for regular arrays). In various embodiments, the conductive features 106a and 106b and/or traces can comprise copper or copper alloys, although other metals may be suitable. For example, the conductive features disclosed herein, such as the conductive features 106a and 106b, can comprise fine-grain metal (e.g., a fine-grain copper). In specific embodiments described hereinbelow, at least one of the conductive features 106a and 106b is predominantly aluminum.

Thus, in direct bonding processes, a first element 102 can be directly bonded to a second element 104 without an intervening adhesive. In some arrangements, the first element 102 can comprise a singulated element, such as a singulated integrated device die. In other arrangements, the first element 102 can comprise a carrier or substrate (e.g., a wafer) that includes a plurality (e.g., tens, hundreds, or more) of device regions that, when singulated, form a plurality of integrated device dies. Similarly, the second element 104 can comprise a singulated element, such as a singulated integrated device die. In other arrangements, the second element 104 can comprise a carrier or substrate (e.g., a wafer). The embodiments disclosed herein can accordingly apply to wafer-to-wafer (W2W), die-to-die (D2D), or die-to-wafer (D2W) bonding processes. In wafer-to-wafer (W2W) processes, two or more wafers can be directly bonded to one another (e.g., direct hybrid bonded) and subsequently singulated using a suitable singulation process. After singulation, side edges of the singulated structure (e.g., the side edges of the two bonded elements) may be substantially flush and may include markings indicative of the common singulation process for the bonded structure (e.g., saw markings if a saw singulation process is used).

As explained herein, the first and second elements 102 and 104 can be directly bonded to one another without an adhesive, which is different from a deposition process and results in a structurally different interface compared to a deposition. In one application, a width of the first element 102 in the bonded structure is similar to a width of the second element 104. In some other embodiments, a width of the first element 102 in the bonded structure 100 is different from a width of the second element 104. Similarly, the width or area of the larger element in the bonded structure may be at least 10% larger than the width or area of the smaller element. The first and second elements 102 and 104 can accordingly comprise non-deposited elements. Further, directly bonded structures 100, unlike deposited layers, can include a defect region along the bond interface 118 in which nanometer-scale voids (nanovoids) are present. The nanovoids may be formed due to activation of the bonding surfaces 112a and 112b (e.g., exposure to a plasma). As explained above, the bond interface 118 can include concentration of materials from the activation and/or last chemical treatment processes. For example, in embodiments that utilize a nitrogen plasma for activation, a nitrogen peak can be formed at the bond interface 118. The nitrogen peak can be detectable using secondary ion mass spectroscopy (SIMS) techniques. In various embodiments, for example, a nitrogen termination treatment (e.g., exposing the bonding surface to a nitrogen-containing plasma) can replace OH groups of a hydrolyzed (OH-terminated) surface with $NH_2$ molecules, yielding a nitrogen-terminated surface. In embodiments that utilize an oxygen plasma for activation, an oxygen peak can be formed at the bond interface 118 In some embodiments, the bond interface 118 can comprise silicon oxynitride, silicon oxycarbonitride, or silicon carbonitride. As explained herein, the direct bond can comprise a covalent bond, which is stronger than van Der Waals bonds. The bonding layers 108a and 108b can also comprise polished surfaces that are planarized to a high degree of smoothness.

In various embodiments, the metal-to-metal bonds between the conductive features 106a and 106b can be joined such that metal grains grow into each other across the bond interface 118. In some examples of direct hybrid bonding, the metal is or includes copper, which can have grains oriented along the 111 crystal plane for improved copper diffusion across the bond interface 118. In some examples of direct hybrid bonding, the conductive features 106a and 106b may include nanotwinned copper grain structure, which can aid in merging the conductive features during anneal. In specific embodiments described herein below, one or both of the conductive features 106a and 106b can be predominantly aluminum and hillock formation during anneal can facilitate merging the conductive features. The bond interface 118 can extend substantially entirely to at least a portion of the bonded conductive features 106a and 106b, such that there is substantially no gap between the non-conductive bonding layers 108a and 108b at or near the bonded conductive features 106a and 106b. In some embodiments, a barrier layer may be provided under and/or laterally surrounding the conductive features 106a and 106b (e.g., which may include copper). In other embodiments, however, there may be no barrier layer under the conductive features 106a and 106b, for example, as described in U.S. Pat. No. 11,195,748, which is incorporated by reference herein in its entirety and for all purposes. Predominantly aluminum features typically do not include sidewall barrier materials to contain them, as aluminum does not readily diffuse into surrounding dielectrics as readily as copper does.

Beneficially, the use of the direct hybrid bonding techniques described herein can enable extremely fine pitch between adjacent conductive features 106a and 106b, and/or small pad sizes. For example, in various embodiments, the pitch p (i.e., the distance from edge-to-edge or center-to-center, as shown in FIG. 1A) between adjacent conductive features 106a (or 106b) can be in a range of 0.5 microns to 100 microns, 0.5 microns to 50 microns, in a range of 0.75 microns to 25 microns, in a range of 1 micron to 25 microns, in a range of 1 micron to 10 microns, or in a range of 1 micron to 5 microns. Further, a major lateral dimension (e.g., a pad diameter) can be small as well, e.g., in a range of 0.25 microns to 30 microns, in a range of 0.25 microns to 5 microns, or in a range of 0.5 microns to 5 microns.

As described above, the non-conductive bonding layers 108a, 108b can be directly bonded to one another without an adhesive and, subsequently, the bonded structure 100 can be annealed. Upon annealing, the conductive features 106a, 106b can expand and contact one another to form a metal-to-metal direct bond. In some embodiments, the materials of the conductive features 106a, 106b can interdiffuse during the annealing process.

Figure 2:
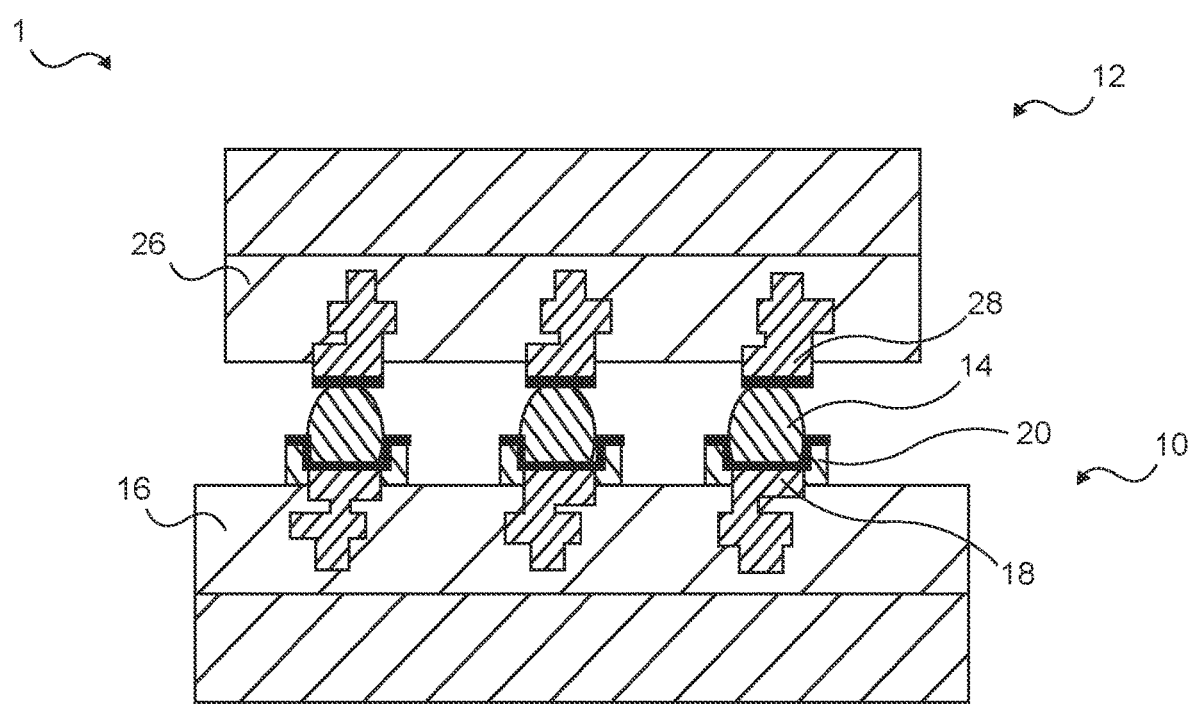
FIG. 2 is a schematic cross-sectional side view of a bonded structure including elements bonded through solder balls.

FIG. 2 is a schematic cross-sectional side view of a bonded structure 1. The bonded structure 1 includes a first element 10 and a second element 12 bonded by way of solder balls 14. The first element 10 includes a first back end of line (BEOL) layer 16 or a redistribution layer (RDL), and aluminum pads 18. The element 10 may include a barrier layer over the aluminum pads 18. A polymer layer 20 can be disposed over a surface of the BEOL layer 16 for supporting the solder balls 14. The second element 12 includes a second BEOL layer 26 and aluminum pads 28. The solder balls 14 are provided with the first element 10 and bonded to the aluminum pads 28 of the second element 12. In practice, after electrically interconnecting the first element 10 and the second element 12, an underfill material is introduced into gap between the exposed surfaces of the BEOL layers 16, 26. Subsequent higher temperature thermal treatment hardens the underfill material to mechanically bond the first element 10 and the second element 12. A polymer adhesive material may be integrated over the exposed surface(s) of the BEOL layers 16, 26 in place of underfill. After aligning the second element 12 over the first element 10, the assembled elements are exposed to higher temperatures to electrically connect the first element 10 to the second element 12 and the respective integrated polymer adhesive or underfill material bonds with each other, thereby mechanically filling the gap between the assembled first element 10 and second element 12.

Using the solder balls 14 may not be feasible for relatively fine pitch interconnects, such as an interconnect pitch of less than 50 micron, or less than 0.5 microns. Additionally, because the mechanical connection between the elements 10 and 12 is limited to the solder joints, the mechanical connection can be weak and subject to separation from physical stresses or shocks. Therefore, it can be beneficial to provide a bond surface that can directly hybrid bond the elements 10, 12 together.

Figure 3A:
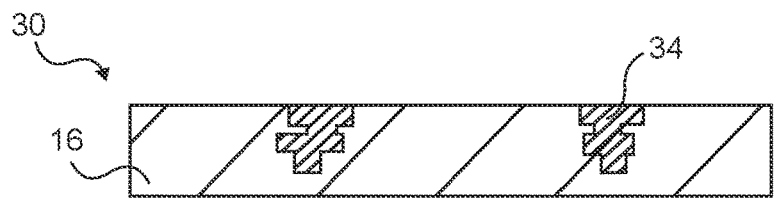
FIGS. 3A-3E are schematic cross sections showing a method of forming conductive features over aluminum interconnects formed in a back-end-of-line (BEOL) layer of an element.
Figure 3B:
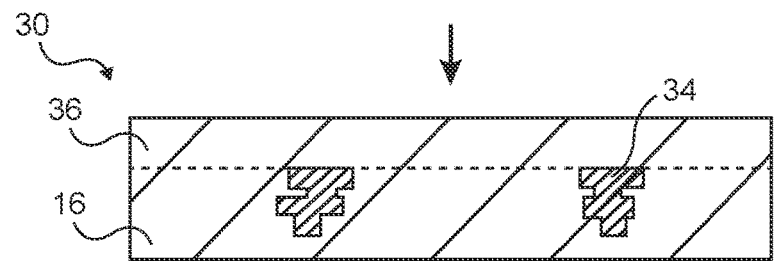
Figure 3C:
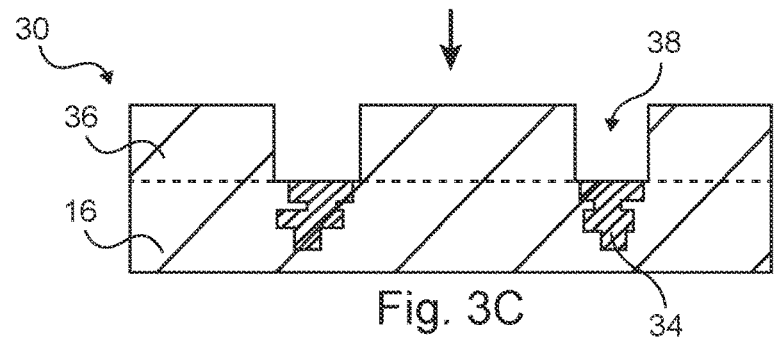

FIGS. 3A-3E show a method of forming conductive features 32 over aluminum pads or interconnects 34 formed with a BEOL layer 16 of an element 30. At FIG. 3A, the BEOL layer 16 can be provided. As shown in FIG. 3B, the method includes forming a dielectric layer 36 over the BEOL layer 16. At FIG. 3C, cavities 38 are formed in the dielectric layer 36 by, for example, lithographic methods and/or selective reactive ion etching (RIE) methods. The aluminum pads or interconnects 34 can be exposed through the cavities 38.

Figure 3D:
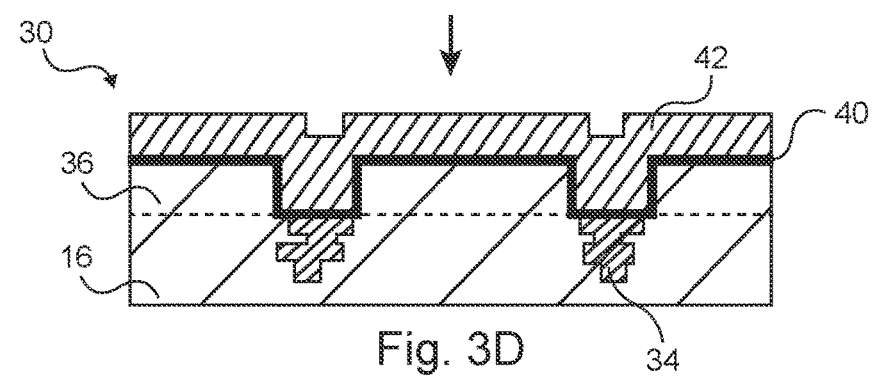
Figure 3E:
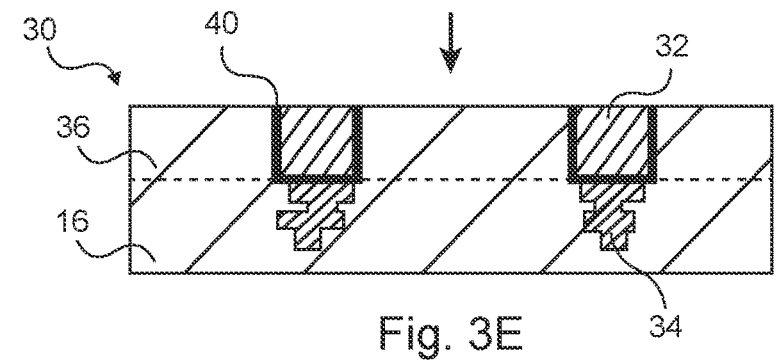

At FIG. 3D, a barrier layer 40 and/or a seed layer can be formed over the dielectric layer 36 and surfaces of the cavities 38. A conductive material 42 is provided at least in the cavities over the barrier layer 40. At FIG. 3D the conductive material 42 is overfilled and the excess conductive material 42 is present over the surface of the dielectric layer 36. The excess conductive material 42 can be removed in FIG. 3E to form the conductive feature 32. The excess conductive material 42 can be removed, for example, by way of polishing, such as chemical mechanical planarization (CMP). The polishing process can also remove portions of the barrier layer 40 from over the surface of the dielectric layer 36, and form a direct bonding surface of the element 30 after activation and/or termination as described above. Depending on the fabrication method of the conductive feature 32, the barrier layer 40 may be omitted from the sidewall of the cavity 38. The barrier layer 40 may be disposed at the bottom of the cavity 38.

The conductive material 42 can comprise, for example, copper, aluminum, nickel, or any suitable conductive material. Metals can be susceptible to oxidation, and a surface oxide (e.g., a native oxide or an anodic oxide) layer may be formed over the conductive feature 32. For example, copper oxide may be formed with copper, aluminum oxide may be formed with aluminum, and nickel oxide may be formed with nickel. Some surface oxides do not adhere to another metal or metal oxide sufficiently, are electrically insulating or isolative, and may prevent diffusion of metal atoms of corresponding conductive features. Thus, the surface oxide impedes direct bonding of the conductive feature 32 with a corresponding conductive feature of another element.

Figure 4A:
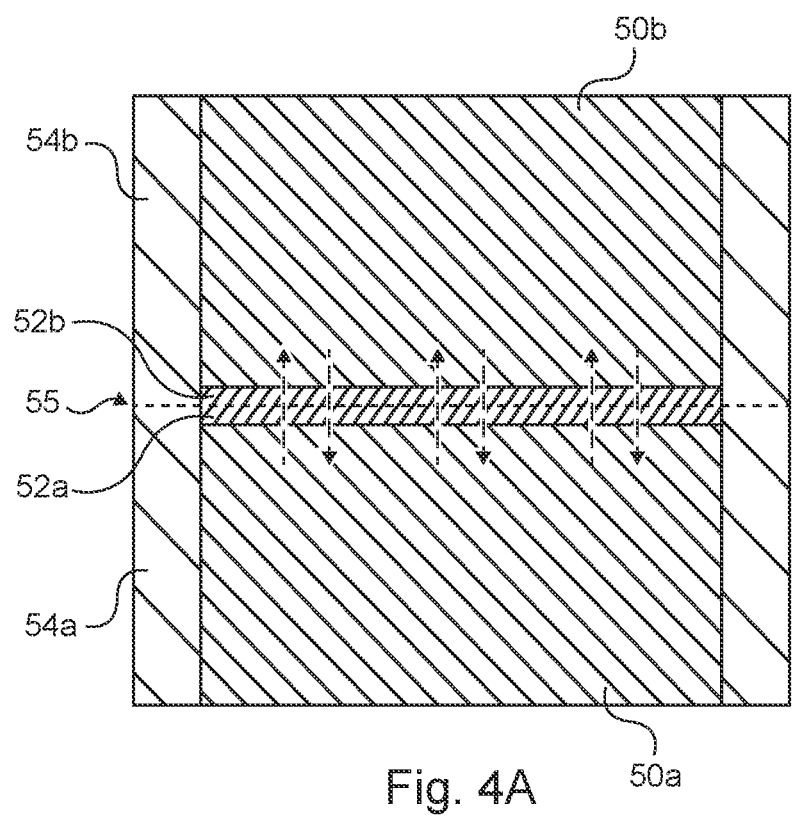
FIG. 4A is a schematic cross-sectional side view of a portion of a bonded structure that includes copper pads having copper oxide layers therebetween.

FIG. 4A is a schematic cross-sectional side view of a portion of a bonded structure that includes copper pads 50a, 50b having copper oxide layers 52a, 52b therebetween. The bonded structure includes nonconductive field regions 54a, 54b that are bonded to one another along a bond interface 55 and the copper pads 50a, 50b that are bonded along to one another the bond interface 55. In the bonded structure of FIG. 4A, the copper oxide layers 52a, 52b bond to one another and do not prevent copper atoms of the copper pads 50a, 50b to interdiffuse across the bond interface. Thus, an electrical interconnection between the copper pads 50a, 50b and a sufficiently strong mechanical bond can be formed between the copper pads 50a, 50b.

Figure 4B:
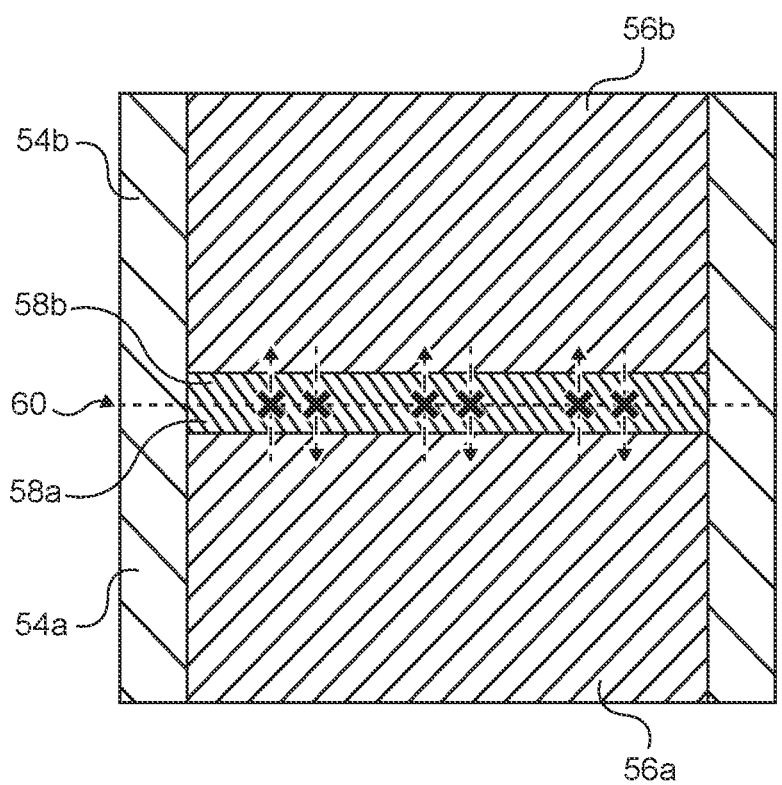
FIG. 4B is a schematic cross-sectional side view of a portion of a structure that includes aluminum pads having aluminum oxide layers therebetween.

FIG. 4B is a schematic cross-sectional side view of a portion of a structure that includes aluminum pads 56a, 56b having aluminum oxide layers 58a, 58b therebetween. The structure includes nonconductive field regions 54a, 54b that are bonded to one another along a bond interface 60 and the aluminum pads 56a, 56b that are not bonded to one another. In the structure of FIG. 4B, the aluminum oxide layers 58a, 58b may not bond and may prevent aluminum atoms of the aluminum pads 56a, 56b to interdiffuse. Therefore, no electrical connection between the aluminum pads 56a, 56b may be formed. Thus, due to excessive interference from aluminum oxide, which tends to form naturally even upon exposure to clean room air and moisture, a conductive and sufficiently strong mechanical bond may not be formed between the aluminum pads 56a, 56b.

Referring back to FIGS. 3A-3E, to avoid oxidation, the conductive feature 32 of the element 30 can be formed in vacuum and bonded to another element while the element 30 is still in the vacuum. However, such process may be costly. For example, such a process may apply argon ions to sputter clean the surface of the conductive features 32 in vacuum and bonding the element 30 to another element in vacuum. In practice, a portion of conductive feature 32 sputter cleaned from the surface of the conductive feature 32 may redeposit over a portion of the dielectric layer 36. The contamination of the bonding surface of the dielectric layer 36 can cause electrical leakage in the bonded elements.

One solution to avoid surface oxidation is to activate the surfaces of the conductive feature 32 with nitrogen to form aluminum nitride on the surfaces of the conductive feature 32, such as with nitrogen plasma treatments described above, immediately after an oxide cleaning or in situ with the aluminum feature formation. The activated aluminum surface is rinsed with a suitable solvent, such as deionized (DI) water or low molecular weight alcohols amongst others, to remove the contaminating particles on the nonconductive field regions 54a. The cleaned substrates are dried before bonding. While some metal nitride, such as aluminum nitride, at the surface is easier to deal with for direct bonding than some metal oxide, such as aluminum oxide, such processes may call for a high temperature (e.g., 350° C. to 400° C.) anneal in the bonding process in order to allow the aluminum nitride from the conductive features 32 of opposing elements to decompose. Aluminum atoms of opposing conductive features 32 interdiffuse through the decomposed aluminum nitride, and thereby electrically and mechanically couple the conductive features 32 of opposing elements. The high temperature annealing steps increase the thermal budget for forming a bonded structure. In addition to increasing thermal budget for bonding, forming aluminum nitride also involves costly prevention of aluminum oxide formation between either conductive feature formation or cleaning and subsequent nitridation. Various embodiments disclosed herein can achieve more simplified, cost-effective methods and structures for forming a bonded structure.

Figure 5A:
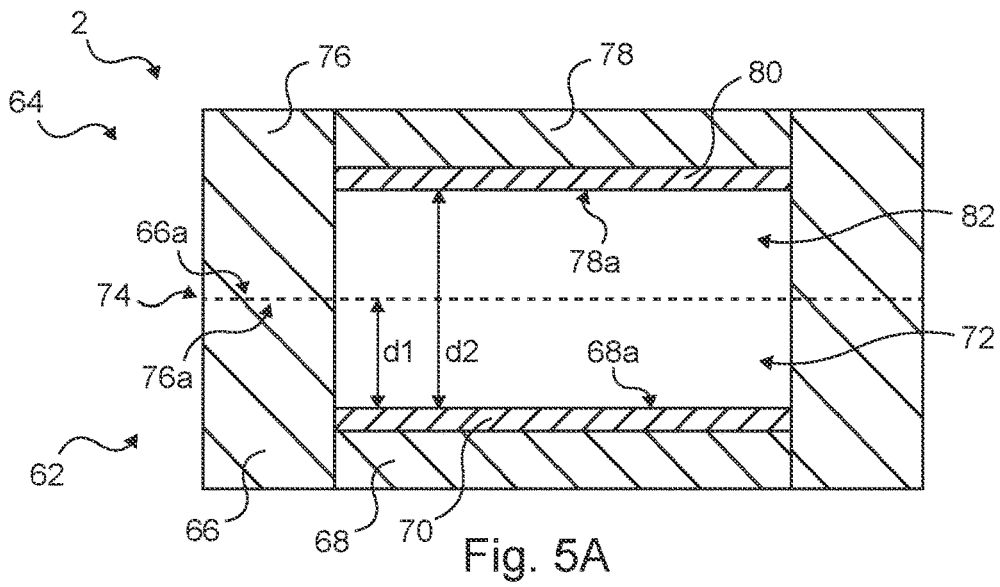
FIG. 5A is a schematic cross-sectional side view of a structure that includes a first element and a second element that is disposed over the first element, according to an embodiment.

FIG. 5A is a schematic cross-sectional side view of a partially bonded structure 2 that includes a first element 62 and a second element 64 that is disposed over the first element 62, according to an embodiment. As described above, the elements 62, 64 can each individually comprise integrated circuits or chips, wafers, chip packages, individual passive devices, individual active devices, etc., only a small portion of which is shown. In some embodiments, the first element 62 and the second element 64 can be identical or generally similar with aligned conductive features. In some other embodiments, the first element 62 and the second element 64 can be different but still have aligned conductive features. The description of the first element 62 may be applicable to the second element 64. The alignment need not be perfect in the bonding process, as will be appreciated by the skilled artisan.

The first element 62 can include a first nonconductive field region 66 and a first conductive feature 68. It will also be understood that the elements 62, 64 can each include multiple adjacent conductive features, such as an array of contact pads, only one of which is shown. The first conductive feature 68 can have a first oxide layer 70 formed at a surface 68a of the first conductive feature 68. The first nonconductive field region 66 can comprise any suitable dielectric material, and be prepared for direct bonding as disclosed herein. The first conductive feature 68 can comprise a metal, such as aluminum or nickel, and can be predominantly aluminum or nickel. For example, the first conductive feature 68 can comprise an alloy, such as an aluminum alloy having about 2 at. % copper or about 2 at. % tantalum. For example, the aluminum alloy can comprise less than 10 at. % copper or tantalum, such as 0.1 at. % to 10 at. %, 1 at. % to 4 at. %, or 2 at. % to 4 at. % Cu or Ta. Copper and/or tantalum in the aluminum alloy can help prevent electromigration. In some embodiments, the first conductive feature 68 can comprise at least 90 at. % aluminum. The first oxide layer 70 can comprise a metal oxide, such as aluminum oxide or nickel oxide. The oxide layer 70 can be a native oxide layer, an anodic oxide layer, or an intentionally deposited oxide layer. Generally, a thickness of the oxide layer 70 can be about 2 nm to 100 nm or 2 nm to 50 nm. The thickness of the oxide layer 70 can be about 2 nm to 7 nm, about 3 nm to 7 nm, about 2 nm to 6 nm, or about 4 nm to 5 nm when the oxide layer 70 is a native oxide layer. The thickness of the oxide layer 70 can be about 10 nm to 100 nm, about 10 nm to 30 nm, or about 15 nm to 50 nm when the oxide layer 70 is an intentionally oxidized (e.g., steam-formed or anodic) oxide layer.

The surface 68a of the first conductive feature 68 that is at least partially defined by the first oxide layer 70 can be recessed from a surface 66a of the first nonconductive field region by a first recess 72. A depth d1 of the first recess 72 (a distance between the surface 68a and a surface 66a of the nonconductive field region 66) is selected such that the depth d1 is sufficient for a hillock to form and grow as described below with respect to FIGS. 5B to 5F. For example, the depth d1 of the recess 72 can be about 30 nm or greater or 50 nm or greater, such as in a range of about 30 nm to 500 nm, 50 nm to 500 nm, about 50 nm to 300 nm, about 100 nm to 500 nm, or about 100 nm to 750 nm. Such depth d1 ranges can be suitable when the thickness of the oxide layer 70 is, for example, less than about 20 nm. The depth d1 of the recess 72 can be selected based at least in part on the thickness of the oxide layer 70 to ensure sufficient room for hillocks to grow sufficiently to pierce the oxide layer 70 and merge with contacts from the opposite substrate during bonding. When the thickness of the oxide layer 70 is greater, the depth d1 can be greater. For example, when the thickness of the oxide layer 70 is 20 nm or greater and 100 nm or less, the depth d1 can be in a range of 100 nm to 2 μm, 500 nm to 2 μm, or 500 nm to 1 μm.

The second element 64 can include a second nonconductive field region 76 and a second conductive feature 78. The second conductive feature 78 can have a second oxide layer 80 formed at a surface 78a of the second conductive feature 78. The second nonconductive field region 76, the second conductive feature 78, and the second oxide layer 80 can have material and dimensions generally similar to those described above for the first nonconductive field region 66, the first conductive feature 68, and the first oxide layer 70.

When the first and second nonconductive field regions 66, 76 are brought into contact, the first and second nonconductive field regions 66, 76 can bond to each other without an intervening adhesive along a bond interface 74 as described herein. When inorganic dielectrics as described herein are properly prepared for direct bonding (planarized, activated and/or terminated) covalent bonds can form from contact at room temperature and without external pressure. When the first and second nonconductive field regions 66, 76, the surfaces 68a, 78a of the first and second conductive features 68, 78 that are defined at least in part by the first and second oxide layers 70, 80 respectively are spaced apart by a distance d2. The distance d2 can be the sum of the recessed depths of the first and second conductive features 68, 78. For example, depending in part upon pad dimensions, grain sizes and thickness of oxide layers 70, 80, the distance d2 can be in a range of 100 nm to 4 μm, 500 nm to 4 μm, 1 μm to 4

µm, 1 µm to 3 µm, 60 nm to 1500 nm, 100 nm to 1500 nm, 100 nm to 1000 nm, or 150 nm to 1000 nm to allow for hillock growth.

Figure 5B:
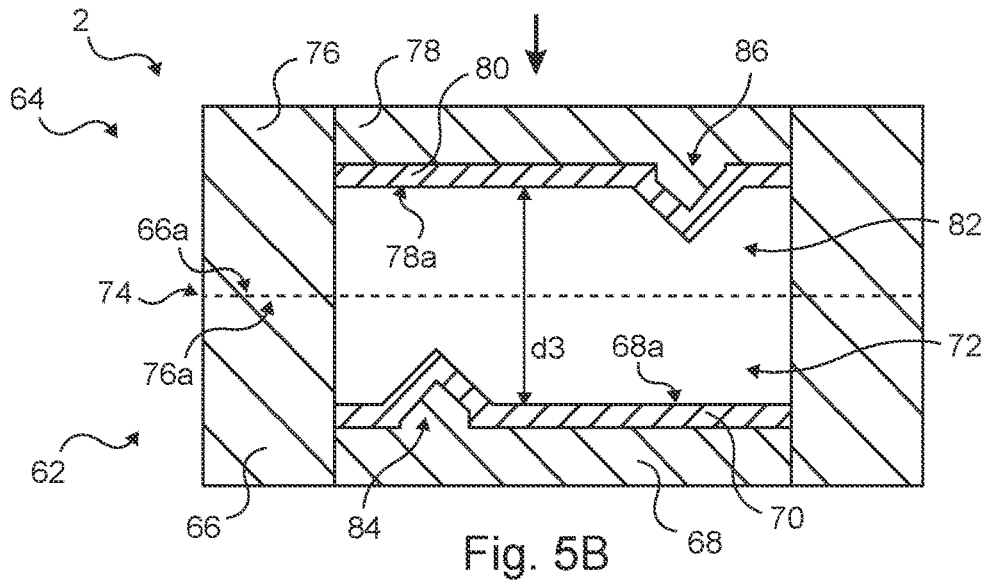
FIG. 5B is a schematic cross-sectional side view of the structure of FIG. 5A after heating the structure for a first duration t1.

FIG. 5B is a schematic cross-sectional side view of the structure 2 of FIG. 5A after heating the structure 2 for a first duration t1. The structure 2 can be heated to directly bond the first and second conductive features 68, 78 as described herein. As shown in FIG. 5A, after heating the structure 2 for the first duration t1, hillocks 84, 86 can begin to form on the surfaces 68a, 78a of the first and second conductive features. The hillocks 84, 86 can form due to compressive stresses developed in the material of the first conductive feature 68. In some embodiments, one hillock can be formed per about 20 µm$^2$ on a surface of a conductive feature. Hillock density on a surface of the first and second conductive features 68, 78 can relate to grain sizes of grains of the first and second conductive features 68, 78, particularly near the surface. For example, smaller grains can have a higher hillock density than larger grains. Also, the temperature, duration, and/or heating cycle can affect the hillock density.

In some embodiments, the heating process can include heating the structure 2 by way of a rapid thermal process (RTP). For example, the heating process can include exposing the structure 2 to radiant heat from one or radiant energy sources, such as heat lamps. Lamps or laser sources can be used as the radiant energy sources. The lamps can include, for example, gas-fillet tungsten filament lamps (e.g., infrared halogen lamps). For example, the lamps can emit radiation that has a wavelength in a visible to microwave range or a visible to infrared range. The RTP can raise the temperature of the conductive features 68, 78 more quickly than the non-conductive field regions 66, 76. Using the RTP for the heating process may be advantageous because the RTP can make the hillocks 84, 86 more likely to penetrate through the first and second oxide layers 70, 80 due to an increased strain rate and an increased strain in the first and second oxide layers 70, 80 caused by the steep temperature ramp and particular due to the temperature ramp difference for metal versus insulating materials during RTP. Thus, the RTP can be advantageous over conventional oven that has a lower temperature increase rate.

After heating the structure 2 for the first duration t1, as the first and second conductive features 68, 78 expand, the surfaces 68a, 78a of the first and second conductive features 68, 78 that are defined at least in part by the first and second oxide layers 70, 80 can move towards each other, and a distance d3 between the surfaces 68a, 78a in FIG. 5B can be smaller than the distance d2 in FIG. 5A.

Figure 5C:
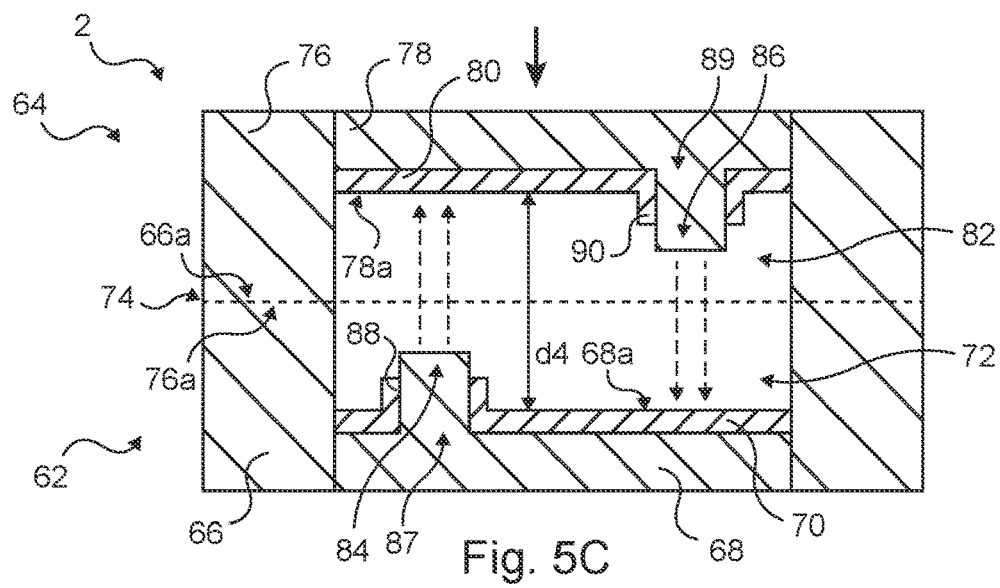
FIG. 5C is a schematic cross-sectional side view of the structure of FIG. 5A after heating the structure for a second duration t2 greater than the first duration t1.

FIG. 5C is a schematic cross-sectional side view of the structure 2 of FIG. 5A after heating the structure 2 for a second duration t2 greater than the first duration t1. After heating the structure 2 for the second duration t2, the hillocks 84, 86 can further extend to penetrate or pierce through the first and second oxide layers 70, 80 there by forming perforations or openings 87, 89 through the first and second oxide layers 70, 80. The first and second oxide layers 70, 80 with the openings 87, 89 can be referred to as perforated oxide layers. The number of perforations or openings 87, 89 and their areal density can correspond to the number of hillocks (e.g., the hillocks 84, 86) and their areal density. The hillocks 84, 86 may not penetrate through the first and second oxide layers 70, 80 at the same time, and there may be a time interval between the time when the hillock 84 penetrate through the first oxide layer 70 and the time when the hillock 86 penetrate through the second oxide layer 80. In some embodiments, burrs 88, 90 of the first and second oxide layers 70, 80 can be formed as a result of the penetration. Thus, the first and second oxide layers 70, 80 can have openings 87, 89, burrs 88, 90 proximate to the openings, and main portions other than the openings 87, 89 and the burrs 88, 90.

After heating the structure 2 for the second duration t2, as the first and second conductive features 68, 78 further expand, the surfaces 68a, 78a of the first and second conductive features 68, 78 that are defined at least in part by the first and second oxide layers 70, 80 can move towards each other, and a distance d4 between the surfaces 68a, 78a in FIG. 5C can be smaller than the distance d3 in FIG. 5B.

Figure 5D:
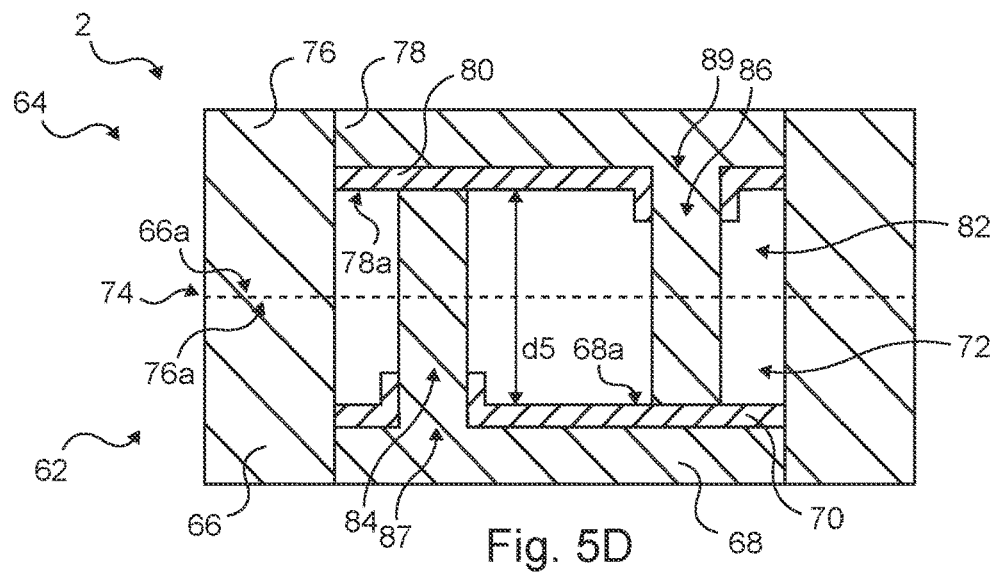
FIG. 5D is a schematic cross-sectional side view of the structure of FIG. 5A after heating the structure for a third duration t3 greater than the second duration t2.

FIG. 5D is a schematic cross-sectional side view of the structure 2 of FIG. 5A after heating the structure 2 for a third duration t3 greater than the second duration t2. After heating the structure 2 for the third duration t3, the hillocks 84, 86 can further extend towards the surfaces 78a, 68a of the opposing second and first conductive features 68, 78. For example, the hillock 84 can reach the surface 78a of the second conductive feature 78 and/or the hillock 86 can reach the surface 68a of the first conductive feature 68. The first and recesses 72, 82 are sealed at least in part by the first and second nonconductive field regions 66, 76, which are bonded to one another. Therefore, surfaces of the hillocks 84, 86 do not form a new oxide layer due to a limited amount of oxygen present in the sealed first and recesses 72, 82.

After heating the structure 2 for the third duration t3, as the first and second conductive features 68, 78 further expand, the surfaces 68a, 78a of the first and second conductive features 68, 78 that are defined at least in part by the first and second oxide layers 70, 80 can move towards each other, and a distance d5 between the surfaces 68a, 78a in FIG. 5D can be smaller than the distance d4 in FIG. 5C.

Figure 5E:
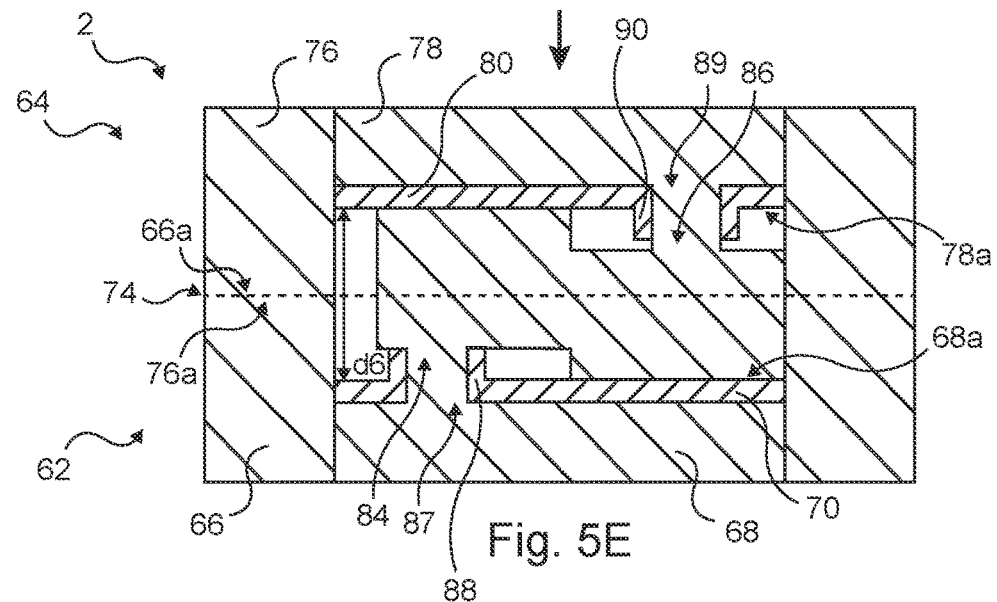
FIG. 5E is a schematic cross-sectional side view of the structure of FIG. 5A after heating the structure for a fourth duration t4 greater than the third duration t3.

FIG. 5E is a schematic cross-sectional side view of the structure 2 of FIG. 5A after heating the structure 2 for a fourth duration t4 greater than the third duration t3. After heating the structure 2 for the fourth duration t4, the hillocks 84, 86 can grow laterally to make contact with each other to thereby makes an electrical connection between the first and second conductive features. The hillocks 84, 86 as illustrated are laterally offset from each other, and the lateral hillock grows is needed for the hillocks 84, 86 to make contact. However, when the corresponding hillocks 84, 86 align with each other, the hillocks 84, 86 may make contact without the lateral growth. Regardless of whether the hillocks 84, 86 meet vertically (when aligned by happenstance) or laterally (from lateral growth), meeting of the hillocks permits more rapid growth through interdiffusion of metal atoms from the opposing conductive features 68, 78.

After heating the structure 2 for the fourth duration t4, as the first and second conductive features 68, 78 further expand, the surfaces 68a, 78a of the first and second conductive features 68, 78 that are defined at least in part by the first and second oxide layers 70, 80 can move towards each other, and a distance d6 between the surfaces 68a, 78a in FIG. 5E can be smaller than the distance d5 in FIG. 5D.

Figure 5F:
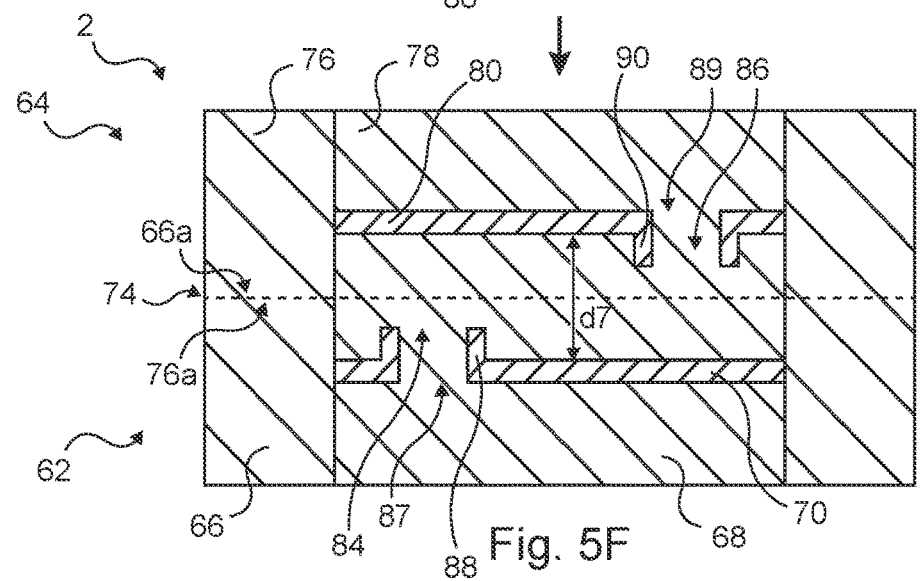
FIG. 5F is a schematic cross-sectional side view of the structure of FIG. 5A after heating the structure for a fifth duration t5 greater than the fourth duration t4.

FIG. 5F is a schematic cross-sectional side view of the structure 2 of FIG. 5A after heating the structure 2 for a fifth duration t5 greater than the fourth duration t4. After heating the structure 2 for the fifth duration t5, the hillocks 84, 86 can further grow to fill more space in the first and second recesses 72, 82. Though only one hillock per conductive feature 68, 78 is illustrated in the cross sections of FIGS. 5B to 5F, it will be understood that more than one hillock can be formed from each of the first and second conductive features 68, 78. Depending at least in part on the composition and grain sizes of the conductive features 68, 78, and annealing time and temperature, hillocks can generally have a density of about 2-10 hillocks per 100 µm² of conductive feature surface area, or about 3-8 hillocks/100 µm² such as about 5 hillocks/100 µm² for an aluminum alloy comprising 2 at. % copper. The conductive features 68, 78 can comprise grain boundaries with triple junctions. The higher the density of grain boundaries with the triple junctions in the microstructure of the conductive features 68, 78, the higher the hillock density the conductive features 68, 78 can have upon heating. Thus, it can be preferable for the conductive features 68, 78 to comprise microstructures having higher concentration of grains with triple junctions.

After heating the structure 2 for the fifth duration t5, as the first and second conductive features 68, 78 further expand, the surfaces 68a, 78a of the first and second conductive features 68, 78 that are defined at least in part by the first and second oxide layers 70, 80 can move towards each other, and a distance d7 between the surfaces 68a, 78a in FIG. 5F can be smaller than the distance d6 in FIG. 5E. In some embodiments, the distance d6 or d7 after the first and second conductive features 68, 78 are connected can be at least about 80 nm. For example, the distance d6 or d7 after the first and second conductive features 68, 78 are connected can be in a range of 50 nm to 100 nm, 80 nm to 1000 nm, 80 nm to 500 nm, or 100 nm to 1000 nm.

As shown in FIGS. 5E and 5F, the first and second oxide layers 70, 80, the openings 87, 89 and/or the burrs 88, 90 can be present after directly bonding the first and second conductive features 68, 78 generally along the bond interface 74. The bond interface 74 may be arbitrary for the first and second conductive features 68, 78, as where the first and second conductive features 68, 78 meet depends at least in part on how the hillocks randomly grow and meet, but for purposes of this disclosure, the bond interface 74 for both dielectric and conductive bonds for the illustrated direct hybrid bonding is considered to be defined by the plane of the neighboring dielectric bond interface. The remaining oxide 70, 80, 88, 90 can have generally similar positions and shapes to those present when the hillocks initially pierce the original oxide layers 70, 80, although they will generally be closer to one another due to underlying expansion of the conductive features 68, 78, and also their relative positions may be slightly disturbed by Brownian motion of adjacent metal atoms during the anneal. At least a portion of the material (e.g., aluminum or nickel) of the conductive feature 68, 78 can be disposed between the first and second oxide layers 70, 80. The first oxide layer 70 can be spaced from the bond interface 74, and the second oxide layer 80 can be spaced from the bond interface 74. For example, after bonding the first and second conductive features 68, 78, the first oxide layer 70 and/or the second oxide layer 80 can be spaced from the bond interface 74 by about 25 nm or greater, 30 nm or greater, or 40 nm or greater, such as in a range of about 25 nm to 400 nm, 30 nm to 400 nm, about 30 nm to 100 nm, about 50 nm to 300 nm, or about 50 nm to 500 nm. The spacing between the first or second oxide layer 70, 80 and the bond interface 74 can depend at least in part on the depth d1 before bonding and expansion amount of the first or second conductive features 68, 78 in the bonding process. In some embodiments, the first and second oxide layers 70, 80 may not directly contact each other.

In some embodiments, the first and/or second conductive feature(s) 68, 78 after bonding can comprise less than 20 at. % of aluminum oxide. For example, the first and/or second conductive feature(s) 68, 78 after bonding can comprise 1 at. % to 20 at. %, 2 at. % to 20 at. %, 5 at. % to 20 at. %, or 10 at. % to 20 at. % of aluminum oxide.

Significantly, the foregoing preparation and bonding process can be conducted upon electronic elements as supplied by, for example, chip manufacturers, without requiring an additional masking step. For example, if the chip as supplied by the manufacturer includes predominantly aluminum pads, a packaging entity may recess the pad from the dielectric surface to the degree desired to ensure hillock formation, and may also planarize and treat the dielectric surface for direct bonding.

As described above, smaller grains can have a higher hillock density than larger grains. In some embodiments, relatively small or fine grains can be positioned at or near a surface of a conductive feature to facilitate more hillock formation, and thus quicker and more reliable bonding between the conductive features.

Figure 6:
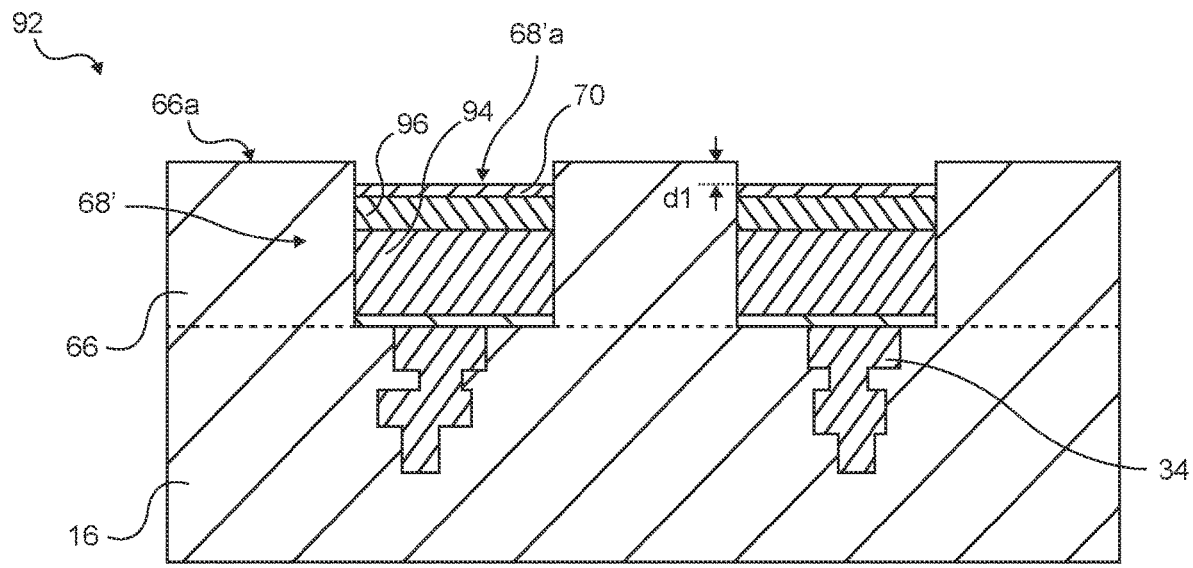
FIG. 6 is a schematic cross-sectional side view of an element that includes a conductive feature having a first portion and a second portion (e.g., a fine grain metal portion) over the first portion, according to an embodiment.

FIG. 6 is a schematic cross-sectional side view of an element 92 that includes a conductive feature 68' having a first portion 94 and a second portion 96 (e.g., a fine grain metal portion) over the first portion, according to an embodiment. Unless otherwise noted, components of FIG. 6 can be the same or generally similar to like components disclosed herein. Grains of the second portion 96 can be smaller than grains of the first portion 94. In some embodiments, the material of the second portion 96 can comprise a fine grain metal (e.g., fine grain aluminum or fine grain nickel). The fine grain metal can be defined as metal having an average grain dimension (e.g., width) less than 15 nm, less than 20 nm, less than 50 nm, less than 100 nm, less than 200 nm, less than 300 nm, or less than 500 nm. For example, the maximum width of grains in the second portion 96 can be in a range of about 10 nm to 500 nm, about 10 nm to 300 nm, about 15 nm to 500 nm, about 15 nm to 300 nm, about 15 nm to 100 nm, about 15 nm to 50 nm, about 50 nm to 500 nm, about 50 nm to 300 nm, or about 100 nm to 300 nm. In some embodiments, most of the grains in the second portion 96 can have a width in a range of about 10 nm to 500 nm, about 10 nm to 300 nm, about 15 nm to 500 nm, about 15 nm to 300 nm, about 15 nm to 100 nm, about 15 nm to 50 nm, about 50 nm to 500 nm, about 50 nm to 300 nm, or about 100 nm to 300 nm. In some embodiments, the maximum grain size of the first portion 94 can be about 2 to 1000 times greater, 10 to 500 times greater, 10 to 100 times greater, 2 to 50 times greater, 2 to 10 times greater, 2 to 5 times greater, 2 to 4 times greater, or 3 to 5 times greater than the maximum grain size of the second portion 96.

As with the elements disclosed herein, such as the first element 62, the conductive feature 68' of the element 92 can have an oxide layer 70 formed at a surface 68'a of the conductive feature 68'. The surface 68'a of the conductive feature 68' can be recessed by a depth d1 as described with respect to FIG. 5A.

Hillock formation may be undesirable when formed at locations other than the surface 68'a of the conductive feature 68. By having fine grain metal in the second portion 96 and larger grain metal in the first portion 94, the location of the hillock formation within the recess can be controlled.

A method of forming the conductive feature 68' of FIG. 6 will be described. In some embodiments, the conductive feature 68' can be formed by separately providing (e.g., depositing) the first and second portions 94, 96. A dielectric material that can at least partially define a nonconductive field region 66 can be provided over a back-end-of-line (BEOL) layer 16 that includes aluminum pads or interconnects 34. An opening can be formed in the dielectric material over the aluminum pads or interconnects 34. The first portion 94 of the conductive feature 68' can be provided in any suitable manner, such as a conventional deposition process, to partially fill the opening. After providing the first portion 94, the second portion 96 can be provided over the first portion 94.

In some embodiments, the second portion 96 with finer grains can be provided by way of a low temperature deposition. For example, the second portion 96 can be deposited at a temperature less than about 100° C., less than about 65° C., or less than about 20° C. For example, a deposition temperature for depositing the second portion 96 can be between about 10° C. and 100° C., between about 10° C. and 65° C., between about 10° C. and 50° C., or between about 10° C. and 20° C. A thickness of the second portion 96 can be thinner than a thickness of the first portion 94. For example the thickness of the second portion 96 can be less than about 500 nm, such as in a range between 50 nm and 500 nm, 100 nm and 500 nm, or 100 nm and 300 nm, whereas the thickness of the first portion 94 can be in a range between 1 micron and 3 microns, 1.5 microns and 3 microns, or 1.5 microns and 2 microns. The element 92 can be bonded to another element (e.g., a die or a wafer) that includes corresponding conductive features. Although grains tend to grow during anneal, both the larger grains and the fine grains will tend to grow, such that some difference in grain sizes between the first and second portions 94, 96 can still be present after the element 92 and the other element are bonded, depending upon the duration and temperature of the anneal.

Another way of increasing hillock density and/or a hillock size (e.g., a hillock height in a direction generally perpendicular to a surface of the metal) is to thermally cycle during the bonding anneal, rather than a single anneal at one temperature. For example, thermally cycling for ten 15-minute cycles has the same overall duration as annealing at the same peak temperature over a single plateau for 2.5 hours. Nevertheless, the thermal cycling at 400° C. or lower can approximately double the hillock density compared to annealing with a single plateau temperature at 400° C. Accordingly, it can be advantageous to cycle the temperature during the bonding anneal.

The elements disclosed herein can be a wafer or a die, and the elements can be bonded to a second element (e.g., a wafer or a die). Therefore, a bonded structure disclosed herein can include a wafer-wafer bonded structure, a wafer-die(s) bonded structure, and a die-die bonded structure. The elements disclosed herein can be bonded to another element of the same or different embodiments disclosed herein. In some embodiments, an element disclosed herein can be bonded to a conventional element having a copper contact feature.

When an element is directly bonded to another element to form a bonded structure, a void may be formed between the elements. The void can interfere with conductor-to-conductor direct bonding in the bonded element. However, by relying on the hillock formation as disclosed herein, the conductor-to-conductor direct bonding may still be formed despite the void. Therefore, yield may be improved.

Figure 7:
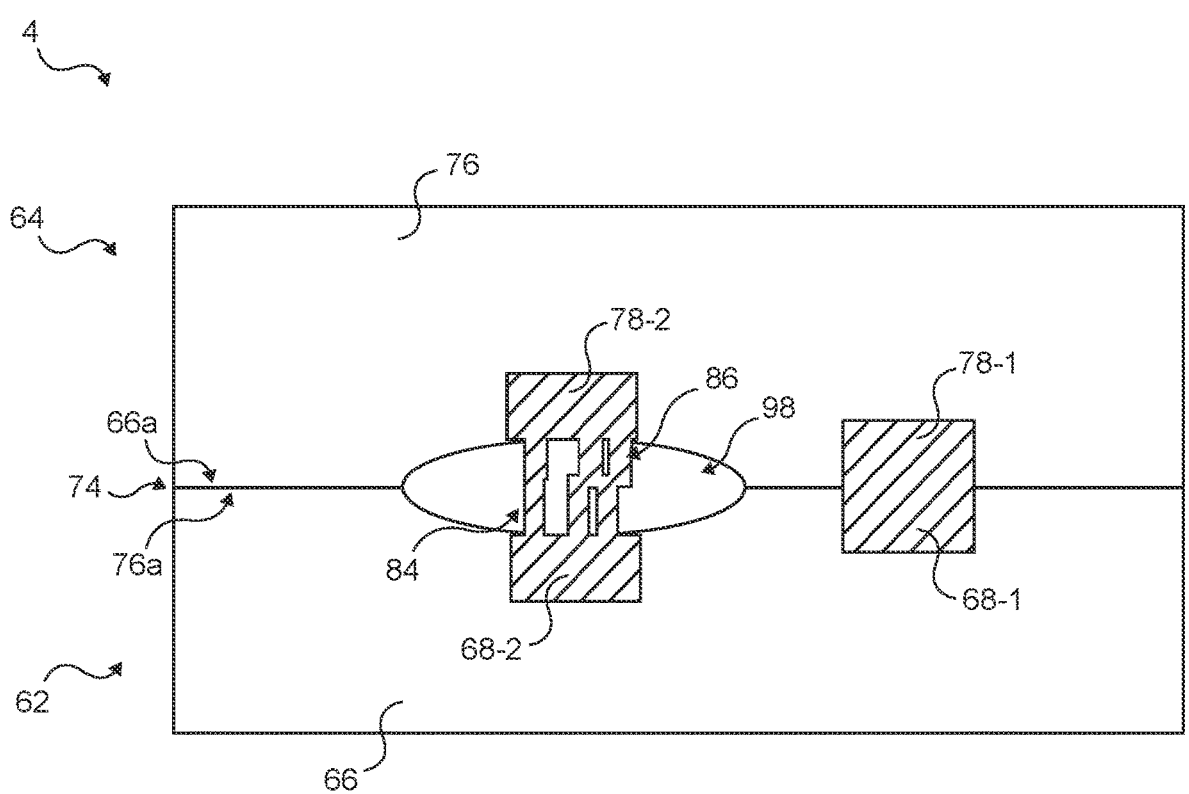
FIG. 7 is a schematic cross-sectional side view of a bonded structure that includes a void, according to an embodiment.

FIG. 7 shows a bonded structure 4 that includes a void 98, according to an embodiment. Unless otherwise noted, components of FIG. 6 can be the same or generally similar to like components disclosed herein. The bonded structure 4 can include a first element 62 and a second element 64 bonded to the first element 62 along a bond interface 74. The first element 62 can include a first nonconductive field region 66 and conductive features 68-1, 68-2. The second element 64 can include a second nonconductive field region 76 and conductive features 78-1, 78-2. The first and second nonconductive field regions 66, 76 are directly bonded to one another without an intervening adhesive. The conductive features 68-7, 78-1 are directly bonded to one another without an intervening adhesive. Due to process variations, the void 98 is formed between the conductive features 68-2, 78-2, even when other conductive features (e.g., 68-1, 78-1) properly merge and fill the gap between them as specified. Nevertheless, the conductive features 68-2, 78-2 are still bonded to one another without an intervening adhesive because the hillocks 84, 86 can extend between the conductive features 68-2, 78-2. Although not ideal and not as intended, the result due to processing to optimize hillock formation is that the entire bonded structure 4 is still operational and yield may be improved.

In one aspect, a bonded structure is disclosed. The bonded structure can include a first element having a first nonconductive field region and a first conductive feature, and a second element having a second nonconductive field region and a second conductive feature. The second element is directly hybrid bonded to the first element such that the first and second nonconductive field regions are directly bonded to one another along a bond interface and the first and second conductive features are directly bonded to one another. The first conductive feature includes a perforated oxide layer.

In one embodiment, the first conductive feature includes aluminum and the perforated oxide layer includes aluminum oxide. The second conductive feature can include aluminum and a second perforated oxide layer can include aluminum oxide. The perforated oxide layer and the second perforated oxide layer can be spaced at least in part by aluminum. A main portion of the perforated oxide layer and a main portion of the second perforated oxide layer can be spaced apart by at least 80 nm. The perforated oxide layer can have a thickness in a range of 2 nm to 50 nm. The perforated oxide layer can have an oxide burr indicative of aluminum of the first conductive feature piercing through the perforated oxide layer.

In one embodiment, a main portion of the perforated oxide layer is vertically spaced from the bond interface between the first and second nonconductive field regions by at least 40 nm.

In one embodiment, the first and second nonconductive field regions include surfaces of inorganic dielectric layers.

In one embodiment, the first conductive feature includes nickel and the perforated oxide layer comprises nickel oxide.

In one aspect, an element having a bonding surface configured to directly hybrid bond to another element is disclosed. The element can include a nonconductive field region that is configured for direct bonding, and an aluminum feature. A surface of the nonconductive field region and a surface of the aluminum feature together define the bonding surface of the element. The surface of the aluminum feature includes aluminum oxide and recessed from the surface of the nonconductive field region by 30 nm or more. The surface of the aluminum feature can be recessed from the surface of the nonconductive field region in a range of 50 nm to 500 nm.

In one embodiment, the aluminum oxide can have a thickness in a range of 2 nm to 100 nm. The aluminum oxide can have a thickness in a range of 2 nm to 7 nm.

In one embodiment, the aluminum feature includes an aluminum alloy including copper or tantalum.

In one embodiment, the aluminum feature has a first portion and a second portion over the first portion and at least partially defining the surface of the aluminum feature. The first portion can have an average grain size substantially greater than an average grain size of the second portion. The average grain size of the second portion can be in a range of 10 nm to 500 nm.

In one aspect, a method of forming a bonded structure is disclosed. The method can include providing a first element having a first nonconductive field region and a first conductive feature. A surface of the first nonconductive field region and a surface of the first conductive feature together define a bonding surface of the first element, the surface of the first conductive feature including an oxide layer. The method can include providing a second element having a second nonconductive field region and a second conductive feature. A surface of the second nonconductive field region and a surface of the second conductive feature together define a bonding surface of the second element. The method can include directly bonding the surfaces of the first and second nonconductive field regions to one another without an intervening adhesive, and directly bonding the first and second conductive features by heating at least the first conductive feature without removing the oxide layer.

In one embodiment, the first conductive feature comprises aluminum and the oxide layer comprises aluminum oxide. The aluminum oxide layer can have a thickness in a range of 2 nm to 7 nm. The surface of the first conductive feature can be recessed from the surface of the nonconductive field region in a range of 50 nm to 500 nm prior to directly bonding the first and second conductive features. The surface of the second conductive feature can include a second oxide layer. The second conductive feature can include aluminum and the second oxide layer can include aluminum oxide. Directly bonding the first and second conductive features can further include heating the second conductive feature without removing the second oxide layer and merging the aluminum of the first conductive feature and the aluminum of the second conductive feature.

In one embodiment, the method further includes depositing a material of the first conductive feature at a temperature less than about 100° C.

In one embodiment, heating at least the first conductive feature forms hillocks that pierce through the oxide layer. Heating at least the first conductive feature grows the hillocks to contact the second conductive feature.

In one embodiment, heating at least the first conductive feature includes a rapid thermal process.

In one embodiment, heating at least the first conductive feature includes a plurality of thermal cycles.

In one aspect, a bonded structure is disclosed. The bonded structure can include a first element having a first nonconductive field region and a first aluminum feature, and a second element having a second nonconductive field region and a second aluminum feature. The second element is directly hybrid bonded to the first element such that the first and second nonconductive field regions are directly bonded to one another along a bond interface and the first and second aluminum features are directly bonded to one another. 1 at. % to 20 at. % of the first aluminum feature is aluminum oxide.

In one embodiment, 5 at. % to 20 at. % of the first aluminum feature is aluminum oxide.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

While certain embodiments have been described, these embodiments have been presented by way of example only, and are not intended to limit the scope of the disclosure. For example, while illustrated embodiments include preparation for direct hybrid bonding, the skilled artisan will appreciate that the techniques taught herein can be useful for direct metal bonding even in the absence of direct dielectric bonding. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. It is also contemplated that various combinations or sub-combinations of the specific features and aspects of the embodiments may be made and still fall within the scope. The accompanying claims and their equivalents are intended to cover such forms or modifications as would fall within the scope and spirit of the disclosure.

What is claimed is:

1. A bonded structure comprising:
a first element having a first nonconductive field region and a first conductive feature extending vertically through the first nonconductive field region; and
a second element having a second nonconductive field region and a second conductive feature extending vertically through the second nonconductive field region, the second element directly hybrid bonded to the first element such that the first and second nonconductive field regions are directly bonded to one another along a horizontal bond interface and the first and second conductive features are directly bonded to one another,
wherein the first conductive feature comprises an oxide layer and conductive material vertically adjacent above and below the oxide layer, including between the oxide layer and the second conductive feature.

2. The bonded structure of claim 1, wherein the first conductive feature comprises aluminum and the oxide layer comprises aluminum oxide.

3. The bonded structure of claim 2, wherein the second conductive feature comprises aluminum and a second oxide layer comprising aluminum oxide, the oxide layer and the second oxide layer are spaced at least in part by aluminum.

4. The bonded structure of claim 3, wherein a main portion of the oxide layer and a main portion of the second oxide layer are spaced apart by at least 80 nm.

5. The bonded structure of claim 2, wherein the oxide layer has a thickness in a range of 2 nm to 50 nm.

6. The bonded structure of claim 2, wherein the oxide layer has an oxide burr indicative of aluminum of the first conductive feature piercing through the oxide layer.

7. The bonded structure of claim 1, wherein the first conductive feature comprises nickel and the oxide layer comprises nickel oxide.

8. The bonded structure of claim 1, wherein the oxide layer comprises a main portion and burrs extending from the main portion toward the second conductive feature, wherein the main portion of the oxide layer is vertically spaced from the bond interface between the first and second nonconductive field regions by at least 40 nm.

9. The bonded structure of claim 1, wherein the first and second nonconductive field regions comprise surfaces of inorganic dielectric layers.

10. The bonded structure of claim 1, wherein oxide layer comprises a perforated structure with the conductive material extending through one or more perforations.

11. The bonded structure of claim 1, wherein oxide layer has a thickness in a range of 2 nm to 100 nm.

12. The bonded structure of claim 1, wherein oxide layer has a thickness in a range of 2 nm to 7 nm.

13. The bonded structure of claim 1, wherein the first conductive feature comprises an aluminum alloy including copper or tantalum.

14. The bonded structure of claim 1, wherein 1 atomic % to 20 atomic % of the first conductive feature is aluminum oxide.

15. The bonded structure of claim 14, wherein 5 atomic % to 20 atomic % of the first conductive feature is aluminum oxide.

16. The bonded structure of claim 1, wherein the conductive material comprises aluminum and the first conductive feature has a first portion and a second portion over the first portion and at least partially defining the surface of the aluminum feature, the first portion having a maximum grain size about 2 to 50 times greater than a maximum grain size of the second portion.

17. The bonded structure of claim 1, wherein the conductive feature is a contact pad.

18. The bonded structure of claim 1, wherein the conductive feature is a through substrate via.

* * * * *